(12) United States Patent
Lee et al.

(10) Patent No.: US 10,666,335 B2
(45) Date of Patent: May 26, 2020

(54) METHOD OF SELECTING BEAM AND ELECTRONIC DEVICE THEREOF

(71) Applicant: SAMSUNG ELECTRONICS CO., LTD., Suwon-si, Gyeonggi-do (KR)

(72) Inventors: Hyoungjoo Lee, Suwon-si (KR); Mingyu Kang, Seoul (KR); Jinwoo Kim, Seoul (KR); Taeyoon Kim, Seongnam-si (KR); Byungwook Yoo, Hwaseong-si (KR); Kookyeon Lee, Suwon-si (KR); Chaeman Lim, Seoul (KR); Ilgyu Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/111,657

(22) Filed: Aug. 24, 2018

(65) Prior Publication Data

US 2019/0068265 A1 Feb. 28, 2019

(30) Foreign Application Priority Data

Aug. 25, 2017 (KR) .......................... 10-2017-0108157

(51) Int. Cl.
*H04B 7/06* (2006.01)
*H04B 7/08* (2006.01)

(52) U.S. Cl.
CPC ......... *H04B 7/0617* (2013.01); *H04B 7/0623* (2013.01); *H04B 7/0695* (2013.01); *H04B 7/088* (2013.01); *H04B 7/0874* (2013.01)

(58) Field of Classification Search
CPC .. H04B 7/0617; H04B 7/0623; H04B 7/0695; H04B 7/0874; H04B 7/088

USPC .......................................................... 375/267
See application file for complete search history.

(56) References Cited

U.S. PATENT DOCUMENTS

| 7,324,817 | B2 | 1/2008 | Iacono et al. |
| 7,366,464 | B2 | 4/2008 | Iacono et al. |
| 2011/0286372 | A1* | 11/2011 | Taghavi Nasrabadi ..................... H04B 7/0851 370/310 |
| 2013/0051302 | A1 | 2/2013 | Kim |
| 2013/0059619 | A1* | 3/2013 | Kim .................... H04W 72/046 455/509 |

(Continued)

FOREIGN PATENT DOCUMENTS

| KR | 10-2006-0111712 | 10/2006 |
| KR | 10-2007-0040368 | 4/2007 |

OTHER PUBLICATIONS

Extended Search Report dated Dec. 14, 2018 in counterpart European Patent Application No. EP18190913.6.

(Continued)

*Primary Examiner* — Michael R Neff
(74) *Attorney, Agent, or Firm* — Nixon & Vanderhye P.C.

(57) ABSTRACT

Disclosed are an apparatus and a method for selecting a beam in an electronic device. An electronic device includes: a plurality of antennas configured to form beams in different directions; and at least one processor, wherein the at least one processor is configured to: control the plurality of antennas to form a wide beam, determine a transmission beam pattern of a transmitting side through the wide beam, control the plurality of antennas to form a reception beam, and determine a reception beam pattern to be used for receiving a signal from the transmitting side.

18 Claims, 21 Drawing Sheets

(56) References Cited

U.S. PATENT DOCUMENTS

| | | | | |
|---|---|---|---|---|
| 2014/0011543 A1* | 1/2014 | Li | ................... | H04W 52/0206 |
| | | | | 455/561 |
| 2014/0328266 A1 | 11/2014 | Yu et al. | | |
| 2017/0207845 A1 | 7/2017 | Moon et al. | | |
| 2018/0331805 A1* | 11/2018 | Xia | ................... | H04L 5/0051 |
| 2019/0103906 A1* | 4/2019 | Athley | ................ | H04B 7/0452 |

OTHER PUBLICATIONS https://en.wikipedia.org/wiki/General-purpose_input/output, Wikipedia, retrieved Jul. 12, 2018, 4 pages.

http://www.sharetechnote.com/html/RACH_LTE.html, retrieved Jul. 12, 2018, 40 pages.

\* cited by examiner

METHOD OF SELECTING BEAM AND ELECTRONIC DEVICE THEREOF

CROSS-REFERENCE TO RELATED APPLICATION

This application is based on and claims priority under 35 U.S.C. § 119 to Korean Patent Application No. 10-2017-0108157, filed on Aug. 25, 2017, in the Korean Intellectual Property Office, the disclosure of which is incorporated by reference herein in its entirety.

BACKGROUND

1) Field

The present disclosure relates to an apparatus and a method for adaptively selecting a beam in a wireless communication system.

2) Description of Related Art

In order to meet the demand for wireless data traffic, efforts to develop a communication scheme (for example, a $5^{th}$-Generation (5G) communication system) for improving a data transmission rate have been made in a wireless communication system.

Implementation of the 5G communication system in an mmWave band (for example, a 60 GHz band) is under consideration in order to achieve a high data transmission rate. In the 5G communication system, technologies such as beamforming, massive MIMO, Full-Dimensional MIMO (FD-MIMO), array antenna, analog beam-forming, and large-scale antenna technologies are being discussed to mitigate a propagation path loss in the ultrahigh-frequency band and increase a propagation transmission distance.

When beamforming technology is applied to a wireless communication system, a transmission beam pattern of a transmitting side (for example, a base station) and a reception beam pattern of a receiving side (for example, an electronic device) need to be determined. The transmission beam pattern may include a specific transmission beam pattern selected to transmit a signal to the receiving side among a plurality of transmission beam patterns that can be used by the transmitting side. The reception beam pattern may include a specific reception beam pattern selected to receive a signal from the transmitting side among a plurality of reception beam patterns that can be used by the receiving side.

In order to determine a transmission beam pattern and a reception beam pattern to apply beamforming technology, the transmitting side and the receiving side consume an amount of time in accordance with the number of transmission beam patterns that can be used by the transmitting side, the number of reception beam patterns that can be used by the receiving side, and multiplication of the transmission period of the synchronization signal.

SUMMARY

Various embodiments of the present disclosure may provide an apparatus and a method for adaptively selecting a beam by an electronic device.

In accordance with an aspect of the present disclosure, an electronic device is provided. The electronic device includes: a plurality of antennas configured to form beams in different directions; and at least one processor, wherein the at least one processor is configured to: control the plurality of antennas to form a wide beam, determine a transmission beam pattern of a transmitting side through the wide beam, control the plurality of antennas to form a reception beam, and determine a reception beam pattern to be used for receiving a signal from the transmitting side.

In accordance with another aspect of the present disclosure, a method of operating an electronic device is provided. The method includes: forming a wide beam through a plurality of antennas for forming beams in different directions; determining a transmission beam pattern of a transmitting side through the wide beam; switching a beam mode of at least one antenna to form a reception beam; and determining a reception beam pattern to be used for receiving a signal from the transmitting side.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Hereinafter, various example embodiments of the present disclosure will be described in greater detail with reference to the accompanying drawings. Further, in the following description of the present disclosure, a detailed description of known functions and configurations incorporated herein may be omitted when it may make the subject matter of the present disclosure rather unclear. The terms which will be described below are terms defined in consideration of the functions in the present disclosure, and may be different according to users, intentions of the users, or customs. Therefore, the definitions of the terms should be based on the contents throughout the disclosure.

The present disclosure describes various example embodiments using the terms adopted in some communication standards, but this is only an example for description. Various embodiments of the present disclosure may be easily modified and applied to other communication systems.

Figure 1A:
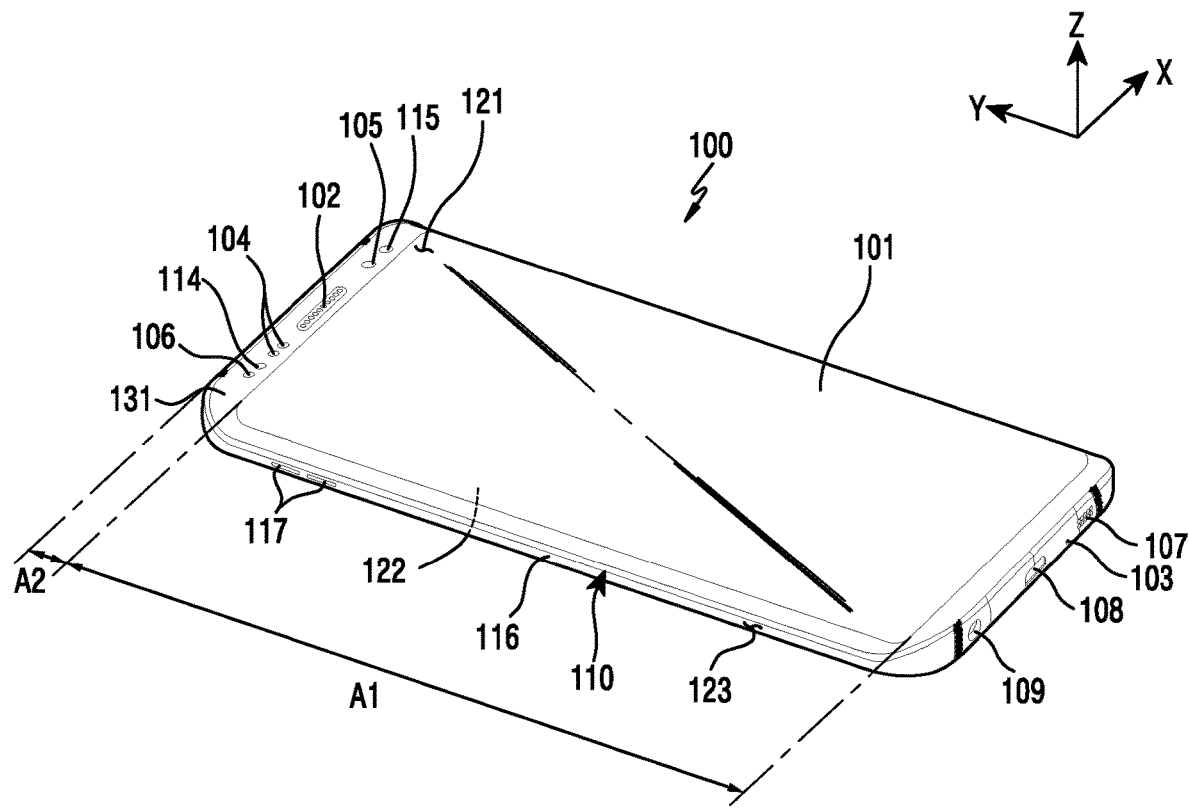
FIGS. 1A, 1B and 1C are diagrams illustrating an example structure of an electronic device according to various embodiments of the present disclosure.
Figure 1B:
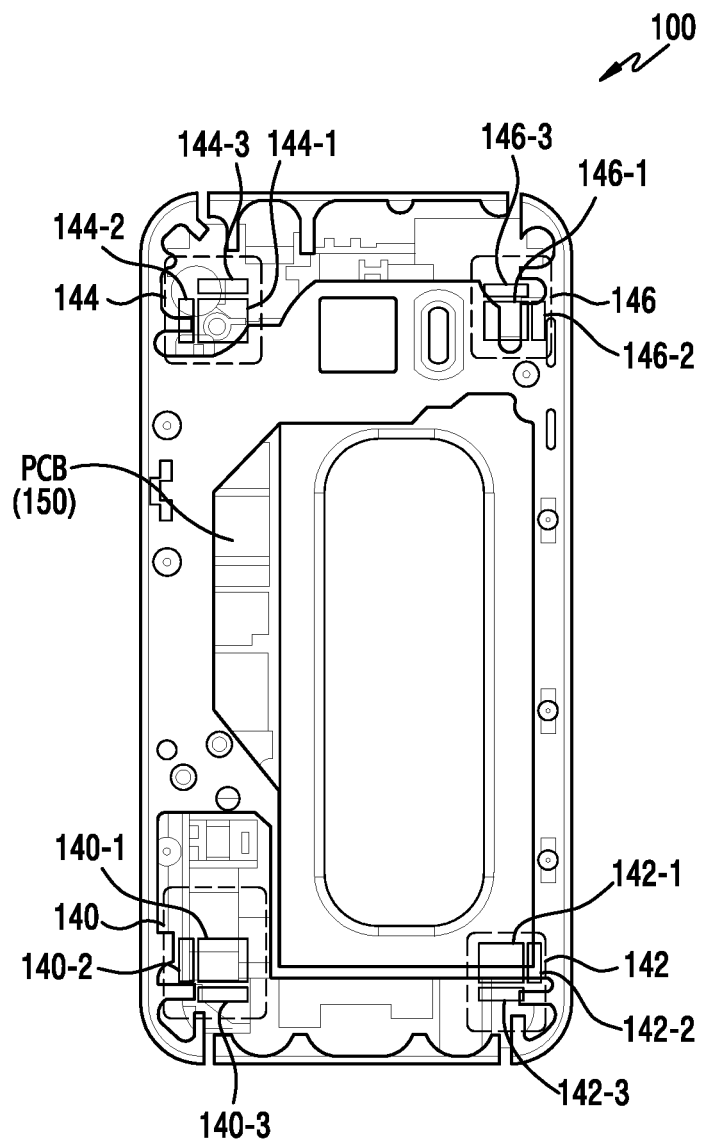
Figure 1C:
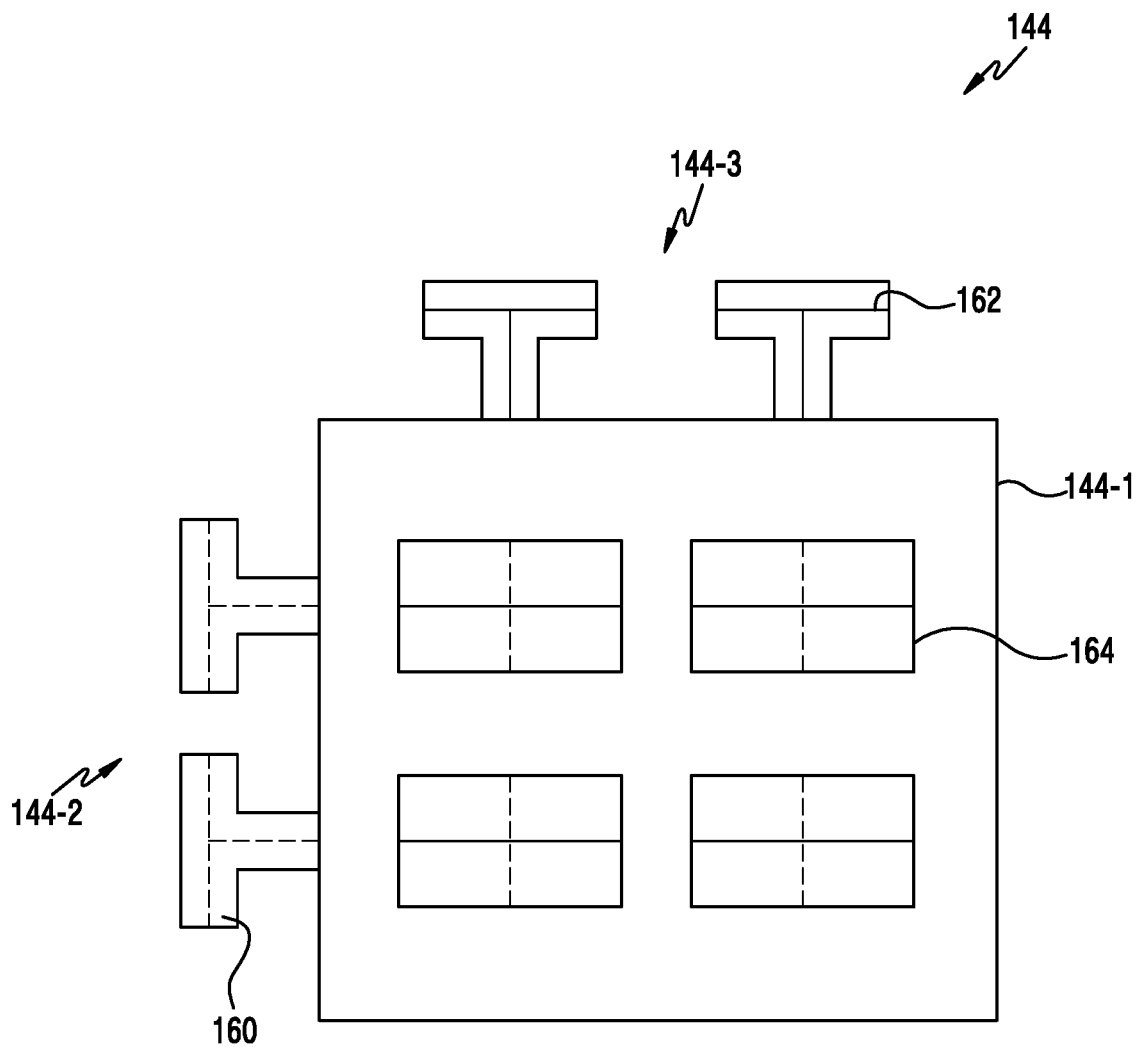

FIGS. 1A, 1B and 1C are diagrams illustrating an example structure of an electronic device according to various embodiments of the present disclosure.

Referring to FIG. 1A, an electronic device 100 may include a housing 110. For example, the housing 110 may comprise a conductive member and/or a non-conductive member.

According an embodiment, the housing 110 may include a first surface 121 (for example, a front surface or a top surface) facing a first direction (for example, a Z axis direction), a second surface 122 (for example, a back surface or a bottom surface) disposed in the direction faced by the first surface 121, and a side surface 123 disposed to surround at least some of the first surface 121 and the second surface 122. For example, the side surface 123 may be coupled to a front plate 131 and a back plate and may be formed by a side bezel structure 116 including metal and/or polymer.

According to an embodiment, the electronic device 100 may include the front plate 131 (for example, a window or glass plate) disposed on the first surface 121. A display 101 may be exposed to the outside through a first area (A1) of the front plate 131.

According to an embodiment, the electronic device 100 may include a call receiver hole 102. For example, the electronic device 100 may be controlled to support a conversation with a counterpart through the call receiver hole 102 using a speaker disposed therein. According to an embodiment, the electronic device 100 may include a microphone hole 103. For example, the electronic device 100 may receive an external voice through the microphone hole 103 using at least one microphone that is disposed therein and detects the direction of a sound.

According to an embodiment, the electronic device 100 may include at least one key input device 117. For example, the key input device 117 may include at least one side key button 117 disposed on the side surface 123 of the housing 110. The at least one side key button 117 may include a volume control button, a power button, or a button for performing a specific function (for example, a function of executing artificial intelligence or a function of entering a fast voice recognition execution mode).

According to an embodiment, the electronic device 100 may include components disposed to be exposed to the display 101 or not to be exposed while performing a function through the front plate 131 and configured to perform various functions of the electronic device 100. For example, at least some of the components may be disposed through a second area (A2) of the front plate 131. For example, the components may include at least one sensor module 104. For example, the sensor module 104 may include an illumination sensor (for example, an optical sensor), a proximity sensor (for example, an optical sensor), an infrared sensor, an ultrasound sensor, a fingerprint recognition sensor, a face recognition sensor, or an iris recognition sensor. For example, the components may include a first camera device 105. For example, the components may include an indicator 106 (for example, an LED device) for visually providing status information of the electronic device 100 to the user. For example, the components may include a light source 114 (for example, an infrared LED) disposed on one side of the receiver 102. For example, the components may include a sensor 115 (for example, an iris camera) for detecting an iris image in the state in which light generated from the light source 114 is radiated to the area surrounding the user's eyes. For example, at least one of the components may be disposed to be exposed through at least some areas of the second surface 122 (for example, the back surface or the bottom surface) in a direction (for example, a −Z axis direction) opposite the first direction of the electronic device 100.

According to an embodiment, the electronic device 100 may include an external speaker hole 107. According to an embodiment, the electronic device 100 may use a speaker disposed therein and output a sound through the external speaker hole 107. According to an embodiment, the electronic device 100 may include a first connector hole 108 (for example, an interface connector port) for performing a function of transmitting/receiving data to/from an external device and receiving external power to charge the electronic device 100. According to an embodiment, the electronic device 100 may include a second connector hole 109 (for example, an earjack assembly) for receiving an earjack of an external device.

According to an embodiment, the electronic device 100 may include a plurality of antenna modules 140, 142, 144 and 146 as illustrated in FIG. 1B. For example, the plurality of antenna modules 140, 142, 144 and 146 may be disposed on the upper side or the lower side of a Printed Circuit Board (PCB) 150 of the electronic device 100. For example, a first antenna module 140 and a second antenna module 142 may be disposed in a first area of the electronic device 100 (for example, a lower area of the electronic device). A third antenna module 144 and a fourth antenna module 146 may be disposed on a second area of the electronic device 100 (for example, an upper area of the electronic device).

According to an embodiment, each antenna module 140, 142, 144, or 146 may include a plurality of antennas for forming beams in different directions. For example, a first antenna module 140 may include a first antenna 140-1 for forming a beam in a rearward direction of the electronic device 100, a second antenna 140-2 for forming a beam in a leftward direction of the electronic device 100, and a third antenna 140-3 for forming a beam in a downward direction of the electronic device 100. For example, a second antenna module 142 may include a first antenna 142-1 for forming a beam in a rearward direction of the electronic device 100, a fourth antenna 142-2 for forming a beam in a rightward direction of the electronic device 100, and a third antenna 142-3 for forming a beam in a downward direction of the electronic device 100. For example, a third antenna module 144 may include a first antenna 144-1 for forming a beam in a rearward direction of the electronic device 100, a second antenna 144-2 for forming a beam in a leftward direction of the electronic device 100, and a fifth antenna 144-3 for forming a beam in an upward direction of the electronic device 100. For example, a fourth antenna module 146 may include a first antenna 146-1 for forming a beam in a rearward direction of the electronic device 100, a fourth antenna 146-2 for forming a beam in a rightward direction of the electronic device 100, and a fifth antenna 146-3 for forming a beam in an upward direction of the electronic device 100. For example, the rearward direction of the electronic device 100 may be the direction faced by the front surface 121 of the electronic device 100, on which the display 101 is disposed. The leftward direction of the electronic device 100 may be a direction in which the key input device 117 is disposed based on the front surface 121 of the electronic device 100 on which the display 101 is disposed. The rightward direction of the electronic device 100 may be a direction opposite the leftward direction of the electronic device 100 based on the front surface 121 of the electronic device 100, on which the display 101 is disposed. The downward direction of the electronic device 100 may be a direction in which the microphone hole 103 is disposed based on the front surface 121 of the electronic device 100, on which the display 101 is disposed. The upward direction of the electronic device 100 may be a direction opposite the downward direction of the electronic device 100 based on the front surface 121 of the electronic device 100, on which the display 101 is displayed.

According to an embodiment, the first antenna 144-1 of the third antenna module 144 may be disposed in the form of an array of a plurality of antenna elements 164, as illustrated in FIG. 1C. For example, the first antenna 144-1 may include an antenna array in which the antenna elements 164 are disposed in M rows and N columns. For example, in the antenna array, the rows may have a first interval ($\lambda V$) therebetween and the columns may have a second interval ($\lambda H$) therebetween. For example, the second antenna 144-2 may be disposed on a left side of the first antenna 144-1 and the fifth antenna 144-3 may be disposed above the first antenna 144-1. For example, $\lambda$ may include a unique wavelength of the antenna.

According to an embodiment, the first antenna 144-1 may control an activation state (for example, ON/OFF) and a phase of each antenna element included in the antenna array. For example, the first antenna 144-1 may determine the direction and sharpness of the beam by controlling at least one antenna element included in the antenna array. For example, the first antenna 144-1 may form a reception beam in a pattern that is determined to be used when the electronic device 101 receives a signal from a transmitting side (for example, the base station (BS)). For example, the first antenna 144-1 may form a wide beam (or a broad beam) by activating at least one antenna element included in the antenna array. For example, the wide beam may include a beam having a beam width wider than that of the reception beam that is used when the electronic device receives a signal from the transmitting side (for example, the BS). The wide beam may include an omnidirectional beam. The reception beam may include a beam of the receiving side (for example, the electronic device 100) having directivity to apply beamforming technology. The reception beam may include a beam having a beam width relatively narrower than that of the wide beam.

According to an embodiment, the electronic device 100 may form the beam through at least one of the plurality of antennas included in the antenna module 140, 142, 144, or 146. For example, the electronic device 100 may form the reception beam through one of the first antenna 144-1, the second antenna 144-2, and the fifth antenna 144-3. For example, the electronic device 100 may select, as the antenna for forming the reception beam, the antenna having the largest received signal strength among from the first antenna 144-1, the second antenna 144-2, and the fifth antenna 144-3. For example, the electronic device 100 may form the wide beam by simultaneously receiving signals through the first antenna 144-1, the second antenna 144-2, and the fifth antenna 144-3. For example, the electronic device 100 may form the wide beam by sequentially receiving signals through the first antenna 144-1, the second antenna 144-2, and the fifth antenna 144-3.

According to an embodiment, a vertically polarized wave of the first antenna 144-1 may be connected to a first port 160, and a horizontally polarized wave may be connected to a second port 162. The second antenna 144-2 may be connected to the first port 160, and the fifth antenna 144-3 may be connected to the second port 162. Signals transferred to the first port 160 and the second port 162 may be independently processed. Accordingly, a signal (y') received through the fifth antenna 144-3 and a signal (y") received through the first antenna 144-1 have a phase difference ($\tau$) therebetween but are transferred to separate ports 160 and 162, so that destructive interference is not generated. A modem of the electronic device 100 may detect a strength of the signal received through each antenna 144-1 or 144-3 by separately processing the signal (y') received through the fifth antenna 144-3 and the signal (y") received through the first antenna 144-1. For example, when the difference between the strength of the signal (y') received through the fifth antenna 144-3 and the strength of the signal (y") received through the first antenna 144-1 is larger than a reference value, the electronic device 100 may select the fifth antenna 144-3 as the antenna to be used for beamforming. For example, the electronic device 100 may acquire a diversity gain by combining the signals received through the fifth antenna 144-3 and the first antenna 144-1.

According to an embodiment, each antenna module 140, 142, 144, or 146 may include an independent reception port. Accordingly, the respective antenna modules 140, 142, 144, and 146 may form reception beams in different patterns. For example, the reception port may include a communication path for transmitting the signal received through the antenna module 140, 142, 144, or 146 to an internal module (for example, the processor) of the electronic device 100.

According to various embodiments of the present disclosure, the electronic device 100 may dispose the first antenna module 140 and the second antenna module 142 on a first side (for example, an upper side) of the electronic device 100, and may dispose the third antenna module 144 and the fourth antenna module 146 on a second side (for example, a lower side) thereof.

Figure 2A:
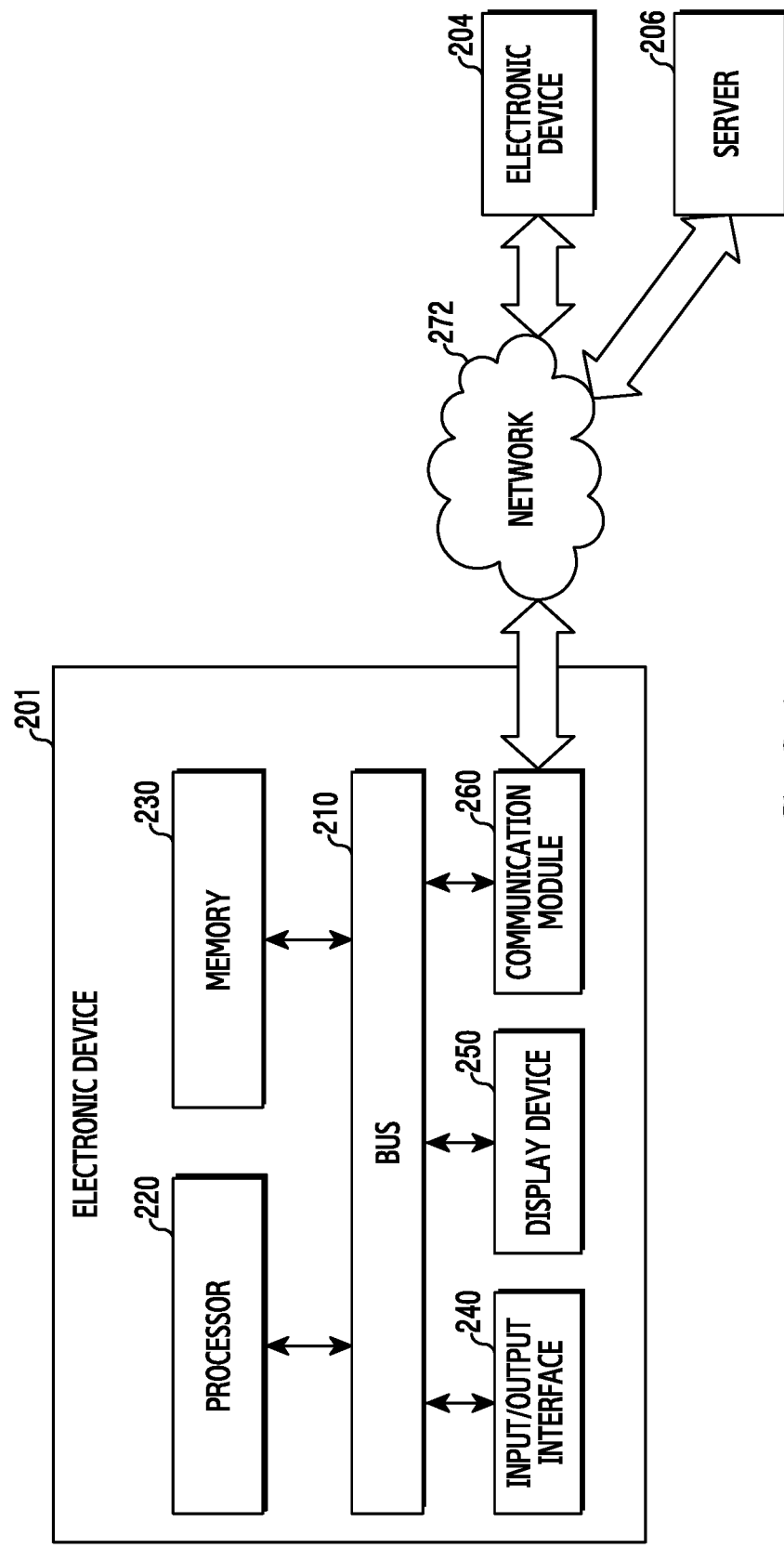
FIG. 2A is a block diagram illustrating an electronic device according to various embodiments of the present disclosure.

FIG. 2A is a block diagram illustrating an electronic device according to an embodiment of the present disclosure. Hereinafter, an electronic device 201 may include all or at least part of the electronic device 100 of FIG. 1.

Referring to FIG. 2A, the electronic device 201 may include a bus 210, a processor (e.g., including processing circuitry) 220, a memory 230, an input/output interface (e.g., including input/output circuitry) 240, a display device 250, and a communication module (e.g., including communication circuitry) 260. In some embodiments, the electronic device 201 may omit at least one of the elements, or may further include other elements.

The bus 210 may include, for example, a circuit for connecting the elements 220 to 260 and transmitting signals (for example, control messages and/or data) between the elements.

The processor 220 may control at least one other element of the electronic device 201 and/or perform calculations or data processing for communication. For example, the processor 220 may include various processing circuitry, such as, for example, and without limitation, one or more of a dedicated processor, a Central Processing Unit (CPU), an Application Processor (AP), a Communication Processor (CP), and/or an Image Signal Processor (ISP), or the like.

According to an embodiment, the processor 220 may determine a transmission beam pattern through the wide beam. For example, the processor 220 may acquire synchronization signal information from the BS when the electronic device 201 accesses the BS. For example, the synchronization signal information may include at least one of the number of available beam patterns of the BS, the time point at which the synchronization signal is transmitted, the interval in which the synchronization signal is transmitted, and the period at which the synchronization signal is transmitted. The processor 220 may control the communication module 260 to form the wide beam at the time point at which the BS transmits the synchronization signal. The processor 220 may determine a transmission beam pattern of the BS by comparing received signal strengths (for example, Received Signal Strength Indications (RSSIs)) corresponding to transmission beam patterns through the wide beam. For example, the processor 220 may select the transmission beam pattern having the largest received signal strength as the transmission beam pattern of the BS. The processor 220 may control the communication module 260 to transmit transmission beam pattern information of the BS to the BS. For example, the processor 220 may control the communication module 260 to transmit information on a plurality of transmission beam patterns having relatively good received signal strength. For example, the transmission beam patterns of the BS may include a specific transmission beam pattern to be used when the BS transmits signals to the electronic device 201 among the plurality of transmission beam patterns that can be used by the BS.

According to an embodiment, when determining the transmission beam pattern, the processor 220 may perform control to selectively use the wide beam. For example, when the strength (for example, the RSSI) of the signal received through the wide beam is larger than or equal to a reference signal strength, the processor 220 may determine that the selection of the transmission beam pattern using the wide beam is reliable. In this case, the processor 220 may determine the transmission beam pattern of the BS by comparing received signal strengths corresponding to the respective transmission beam patterns received through the wide beam. For example, when the strength (for example, the RSSI) of the signal received through the wide beam is smaller than the reference signal strength, the processor 220 may determine that the selection of the transmission beam pattern using the wide beam is not reliable. In this case, the processor 220 may determine the transmission beam pattern of the BS by receiving the synchronization signal of the BS to which different patterns are applied for respective reception beam patterns that can be used by the electronic device 201 For example, the strength of the signal received through the wide beam may include the mean of strengths of signals received through the wide beam during one period in which the BS transmits the synchronization signal or the highest signal strength received through the wide beam.

According to an embodiment, the processor 220 may determine the reception beam pattern of the electronic device 201 through at least one reception port. For example, when a plurality of reception ports is used, the processor 220 may control the communication module 260 to form a plurality of reception beams in different patterns through an antenna corresponding to each reception port during a transmission period of the synchronization signal of the BS. The processor 220 may determine the reception beam pattern of the electronic device 201 by comparing received signal strengths (for example, RSSIs) of a plurality of reception beam patterns that can be used by the electronic device 201. For example, the processor 220 may select the reception beam pattern having the highest received signal strength as the reception beam pattern of the electronic device 201. For example, the received signal strength of the reception beam pattern may include the highest received signal strength received in the corresponding reception beam pattern or the received signal strength of the synchronization signal to which the transmission beam pattern of the BS is applied, received in the corresponding reception beam pattern.

According to an embodiment, the processor 220 may determine the reception beam pattern of the electronic device 201 through the wide beam. For example, a plurality of reception ports is included, and the processor 220 may control the communication module 260 to form the wide beam through antennas corresponding to at least one reception port and form the reception beam of different patterns through antennas corresponding to the remaining reception ports. The processor 220 may determine the reception beam pattern of the electronic device 201 based on a difference between the received signal strength (for example, the RSSI) of the reception beam pattern and the received signal strength of the wide beam. For example, when it is determined that there is a change in the received signal strength, the processor 220 may determine that the reception beam pattern is determined using the wide beam. For example, the generation of the change in the received signal strength may include a condition under which a difference in the signal strength is larger than a reference value while data is received using a specific reception beam pattern. For example, the generation of the change in the received signal strength may include a condition under which a difference in the strength of the synchronization signals received in different reception beam patterns during a first transmission period of the synchronization signal is larger than a reference value. For example, the generation of the change in the received signal strength may include a condition under which the difference in the strength of the synchronization signals received in a specific reception beam pattern during different periods of the synchronization signals is larger than a reference value.

According to an embodiment, the processor 220 may determine whether to reselect the beam pattern through the wide beam. For example, when the transmission beam pattern of the BS and the reception beam pattern of the electronic device 201 are determined, the processor 220 may control the communication module 260 to transmit/receive signals through the corresponding transmission beam pattern and reception beam pattern. When a reception capability (for example, Reference Signals Received Power (RSRP) using the beam pattern deteriorates, the processor 220 may control the communication module 260 to form the wide beam. The processor 220 may determine whether to reselect the beam pattern by comparing the reception capability using the wide beam with the reception capability using the beam pattern. For example, when the difference between the reception capability using the beam pattern and the reception capability using the wide beam is larger than or equal to a reference value, the processor 220 may decide to maintain the current beam pattern (for example, the transmission beam pattern of the BS and the reception beam pattern of the electronic device 201). For example, when the difference between the reception capability using the beam pattern and the reception capability using the wide beam is smaller than the reference value, the processor 220 may determine to change the beam pattern (for example, the transmission beam pattern of the BS and the reception beam pattern of the electronic device 201). For example, the reference value may be determined based on an antenna array gain and a hysteresis value. For example, when it is determined that a change in a wireless channel environment is large, the reference value may apply a low hysteresis value in order to increase the reselection probability of the beam pattern.

The memory 230 may include volatile memory and/or non-volatile memory. For example, the memory 230 may store instructions and/or data related to at least one other element of the electronic device 201.

The input/output interface 240 may transfer a command or data, which is input from a user or another external device, to other element(s) of the electronic device 201. For example, the input/output interface 240 may include various input/output circuitry, such as, for example, and without limitation, at least one physical button such as a home button, a power button, and/or a volume control button, or the like. The input/output interface 240 may output instructions or data, which are received from the other element(s) of the electronic device 201, to the user or the external device. For example, the input/output interface 240 may include a speaker for outputting audio signals and a microphone for collecting audio signals.

The display device 250 (for example, the display) may display various pieces of content (for example, text, images, videos, icons, and/or symbols) to the user. For example, the display device 250 may include a touch screen, but is not limited thereto. The display device 250 may, for example, and without limitation, receive touch input, gesture input, proximity input, and/or hovering input using an electronic pen or a user's body part.

The communication module 260 (for example, the communication interface) may include various communication circuitry and establish communication between the electronic device 201 and an external device (for example, an external electronic device 204 (for example, the BS) or a server 206). For example, the communication module 260 may be connected to a network 272 through wireless communication or wired communication and thus communicate with the external device (for example, the external electronic device 204 or the server 206).

According to an embodiment, the communication module 260 may include a plurality of antennas (for example, the antenna modules 140 to 146 of FIG. 1B) for forming beams. For example, the communication module 260 may control an activation status and a phase of at least one antenna element included in the antenna to form the beam in a pattern for receiving signals from the BS. For example, the communication module 260 may control each antenna to form beams in different patterns through antennas corresponding to different reception ports. For example, when the processor 220 determines to switch to the wide beam, the communication module 260 may control the activation status and the phase of at least one antenna element included in the antenna to form the wide beam.

According to an embodiment, the communication module 260 may form the wide beam through a plurality of antennas (for example, the first antenna 144-1, the second antenna 144-2, and the fifth antenna 144-3 of FIG. 1C) for forming beams in different directions. For example, the communication module 260 may perform control to form the wide beam by simultaneously receiving signals through at least one of the antennas for forming beams in different directions included in one antenna module 140, 142, 144, or 146. The communication module 260 may perform control to form the wide beam by sequentially receiving signals through at least one of the antennas for forming beams in different directions included in one antenna module 140, 142, 144, or 146.

Figure 2B:
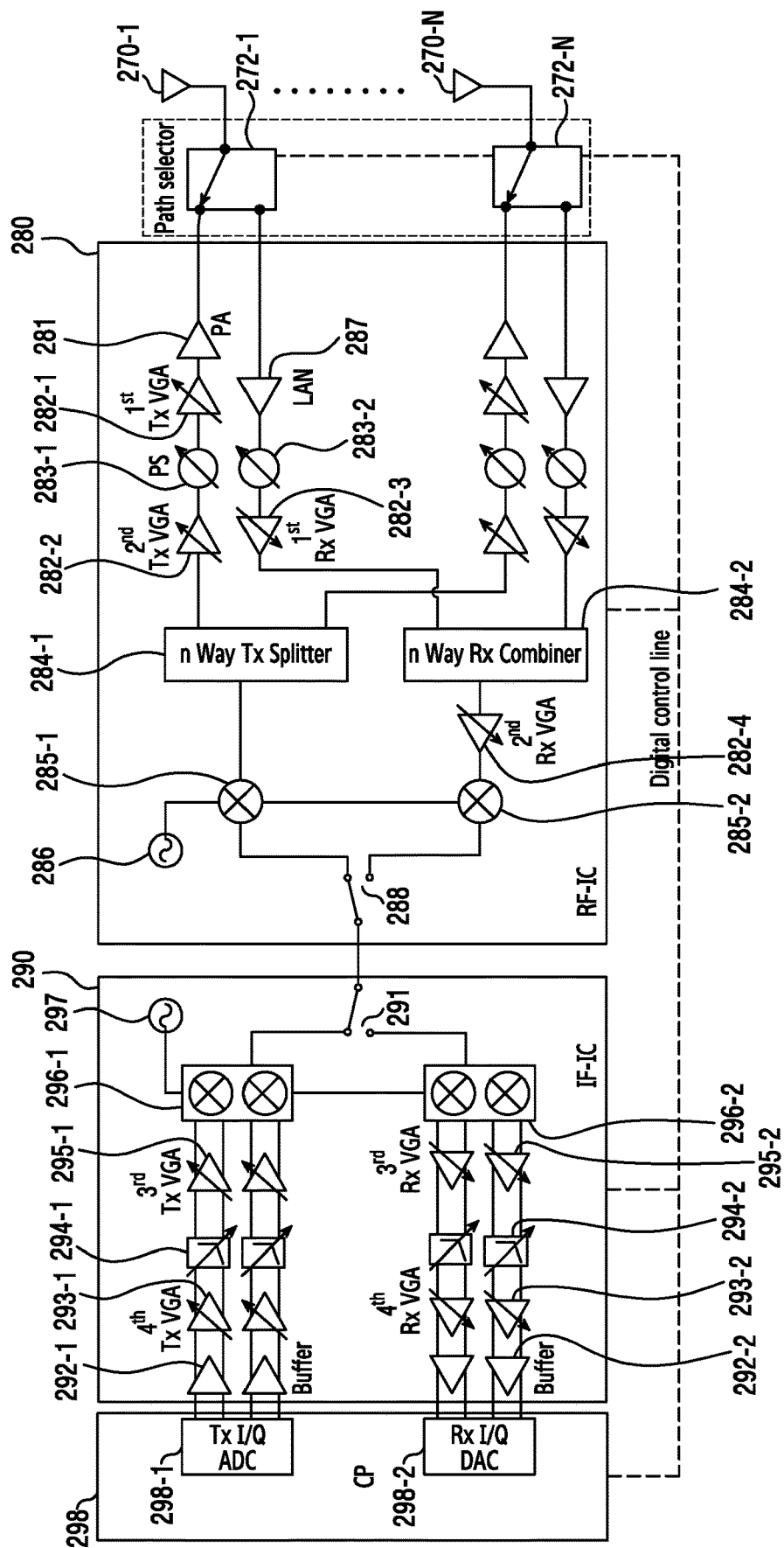
FIGS. 2B and 2C are block diagrams illustrating a communication module according to various embodiments of the present disclosure.
Figure 2C:
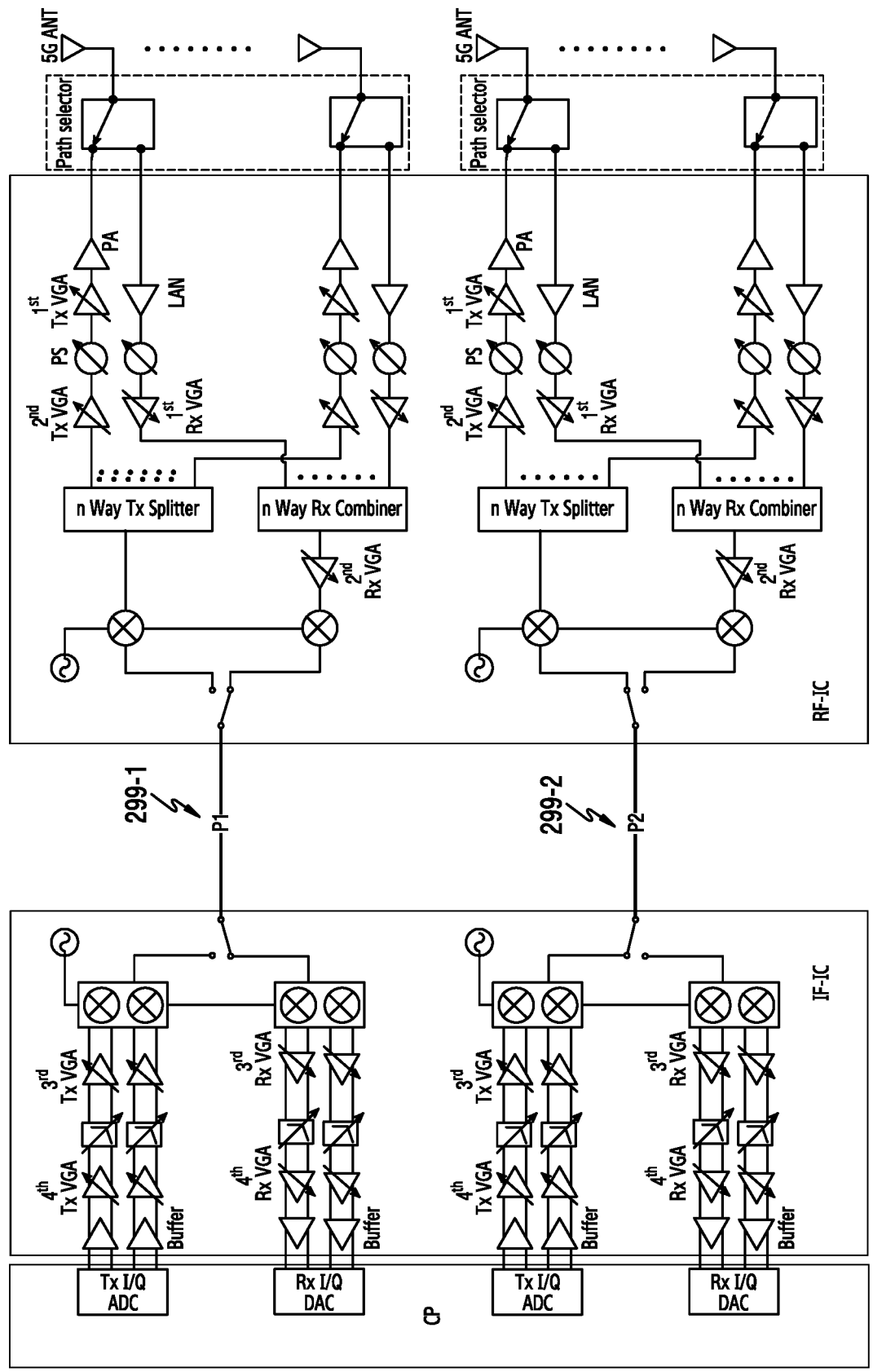

FIGS. 2B and 2C are block diagrams illustrating example communication modules according to various embodiments of the present disclosure.

FIG. 2B includes the configuration of the communication module 260 for processing one data stream through n RF paths (chains). Hereinafter, digital control lines within each IC included in the communication module 260 are omitted. For example, and without limitation, the digital control lines may include a Mobile Industry Processor Interface (MIPI), an Inter-Integrated Circuit (I2C), PCI express (PCIe), a Universal Asynchronous Receiver-Transmitter (UART), a Universal Serial Bus (USB), and/or General-Purpose Input/Output (GPIO), or the like.

According to an embodiment, antennas 270-1 to 270-N may be disposed at a predetermined interval. When the electronic device 201 uses Time-Division Duplex (TDD) communication, the antennas 270-1 to 270-N may selectively connect a transmission (Tx) path and a reception (Rx) path through switches 272-1 to 272-N. For example, the antennas 270-1 to 270-N may include first antennas 140-1, 142-1, 144-1, and 146-1, second antennas 140-2 and 144-2, third antennas 140-3 and 142-3, fourth antennas 142-2 and 146-2, and fifth antennas 144-3 and 146-3 of FIG. 1B.

According to an embodiment, the transmission path may include a Power Amplifier (PA) 281, a first TX Variable Gain Amplifier (VGA) 282-1, a Phase Shifter (PS) 283-1, a second Tx VGA 282-2, a splitter 284-1, and a mixer 285-1 within an RF-IC (higher frequency processing integrated circuit) 280. For example, the PA 281 may amplify the power of the transmitted signal. The PA 281 may be mounted inside or outside the RF-IC. The VGAs 282-1 and 282-2 perform Tx Auto Gain Control (AGC) based on the control of a Communication Processor (CP) 298. The number of Tx VGAs 282-1 and 282-2 included in the transmission path may change. The PS 283-1 may transition the phase of the signal according to a beamforming direction (angle) based on the control of the communication processor 298. The splitter 284-1 may split the transmission signal provided from the mixer 285-1 into n signals. The mixer 285-1 may up-convert a Tx-IF (transmission intermediate frequency) signal received from the IF-IC (intermediate frequency processing integrated circuit) 290 to a transmission signal (RF band). The mixer 285-1 may receive, from an internal or external oscillator 286, a signal into which a band of a transmission signal is converted.

According to an embodiment, the reception path may include a Low-Noise Amplifier (LNA) 287, a PS 283-2, a first Rx VGA 282-3, a combiner 284-2, a second Rx VGA 282-4, and a mixer 285-2 within the RF-IC 280. For example, the LNA 287 may low-noise amplify the signal received from the antenna 270-1. The Rx VGAs 282-3 and 282-4 may perform Rx Auto Gain Control (AGC) based on the control of the communication processor 298. The number of Rx VGAs 282-3 and 282-4 included in the reception path may change. The PS 283-2 may transition the phase of the signal according to a beamforming direction (angle) based on the control of the communication processor. The combiner 284-2 may combine signals of which the phases have been transitioned and which have been arranged with the same phase. The signal combined through the combiner 284-2 may be transmitted to the mixer 285-2 through the second Rx VGA 282-4. The mixer 285-2 may down-convert the signal provided from the second Rx VGA 282-4 from the RF band to an IF band.

According to an embodiment, the RF-IC 280 may further include a switch 288 for selectively connecting the transmission path and the reception path on the back side of the mixers 285-1 and 285-2.

According to an embodiment, the IF-IC 290 may include a switch 291 for selectively connecting the transmission path and the reception path like the RF-IC 280.

According to an embodiment, the transmission path within the IF-IC 290 may include a quadrature mixer 296-1, a third Tx VGA 295-1, a Low-Pass Filter (LPF) 294-1, a fourth Tx VGA 293-1, and a buffer 292-1. For example, the buffer 292-1 may perform buffering when receiving a transmission I/Q signal from the communication processor 298 and thus stably process the signal. The Tx VGAs 293-1 and 295-1 may control the transmission gain of the transmission signal. The LPF 294-1 may act as a channel filter operating with a cutoff frequency for the bandwidth of the transmission I/Q signal in the baseband. For example, the cutoff frequency may be variable. The quadrature mixer 296-1 may up-convert the transmission I/Q signal into the Tx-IF signal.

According to an embodiment, the reception path within the IF-IC 290 includes a quadrature mixer 296-2, a third Rx VGA 295-2, an LPF 294-2, a fourth Rx VGA 293-2, and a buffer 292-2. For example, the buffer 292-2 may perform buffering when transferring the reception I/Q signal provided through the fourth Rx VGA 293-2 to the communication processor 298 and thus stably process the signal. The Rx VGAs 293-2 and 295-2 may control the reception gain of the reception signal. The LPF 294-2 may operate in a cutoff frequency for a bandwidth of the reception I/Q signal in the baseband. The quadrature mixer 296-2 may generate the reception I/Q signal by down-converting the signal into the Rx-IF signal.

According to an embodiment, a transmission I/Q Digital-Analog Converter (DAC) 298-1 within the communication processor 298 may convert a digital signal modulated by the modem into the transmission I/Q signal and transfer the transmission I/Q signal to the IF-IC 290. A reception I/Q Analog-Digital Converter (ADC) 298-2 may convert the reception I/Q signal down-converted by the IF-IC 290 into a digital signal and transfer the digital signal to the modem.

According to an embodiment, the communication module 260 having the structure illustrated in FIG. 2B receives, with a time difference, signals through respective antennas for forming beams in different directions, and then only receives signals without destructive interference attributable to the phase difference.

According to an embodiment, the communication module 260 may be configured as illustrated in FIG. 2C in order to process two data streams. For example, a first port (P1) 299-1 may be connected to the vertically polarized wave of the first antenna 144-1 and the second antenna 144-2, as illustrated in FIG. 1C. A second port (P2) 299-2 may be connected to the horizontally polarized wave of the first antenna 144-1 and the fifth antenna 144-3, as illustrated in FIG. 1C. Accordingly, the communication module 260 may simultaneously receive signals through the first antenna 144-1 and the fifth antenna 144-3 based on the structure illustrated in FIG. 2C without destructive interference.

According to various embodiments of the present disclosure, an electronic device may include: a plurality of antennas configured to form beams in different directions; and at least one processor, wherein the at least one processor may be configured to: control the plurality of antennas to form a wide beam, determine a transmission beam pattern of a transmitting side through the wide beam, control the plurality of antennas to form a reception beam, and determine a reception beam pattern to be used for receiving a signal from the transmitting side.

According to various embodiments, the at least one processor may be configured to: receive at least one signal through the wide beam during a synchronization signal transmission interval of the transmitting side, detect one signal based on a received signal strength of the at least one signal, and select a transmission beam pattern applied to the one signal as the transmission beam pattern of the transmitting side, and the at least one signal includes a synchronization signal to which different transmission beam patterns are applied on the transmitting side.

According to various embodiments, the at least one processor may be configured to: receive at least one signal through the wide beam, determine whether to use the wide beam based on the received signal strength of a signal received through the wide beam, and determine the transmission beam pattern of the transmitting side through the wide beam when it is determined to use the wide beam.

According to various embodiments, when the use of the wide beam is limited, the at least one processor may be configured to: detect a received signal strength of at least one beam combination, select one beam combination based on the received signal strength of the at least one beam combination, and select a transmission beam pattern and a reception beam pattern corresponding to the one beam combination as the transmission beam pattern of the transmitting side and a reception beam pattern to be used for receiving a signal from the transmitting side, and the beam pattern combination includes one of a plurality of transmission beam patterns which can be supported by the transmitting side and one of a plurality of reception beam patterns which can be supported by the electronic device.

According to various embodiments, the at least one processor may be configured to: receive a synchronization signal of the transmitting side through each reception beam pattern which can be supported by the electronic device and select a reception beam pattern to be used for receiving a signal from the transmitting side based on a received signal strength of the synchronization signal received through each reception beam pattern.

According to various embodiments, when a plurality of reception ports is included, the at least one processor may be configured to receive the synchronization signal of the transmitting side through different reception beam patterns for respective reception ports in every synchronization signal transmission period of the transmitting side.

According to various embodiments, the at least one processor may be configured to: receive the synchronization signal of the transmitting side through the wide beam by at least one of the plurality of ports, detect a difference between a received signal strength of the synchronization signal received through each reception beam pattern and a received signal strength of the synchronization signal received through the wide beam, and select a reception beam pattern to be used for receiving a signal from the transmitting side based on the received signal strength of the synchronization signal received through each reception beam pattern and the difference in the received signal strength.

According to various embodiments, the at least one processor may be configured to: identify a first reception capability of the electronic device using the transmission beam pattern and the reception beam pattern, control at least one antenna to form the wide beam when the first reception capability becomes equal to or lower than a reference capability, identify a second reception capability of the electronic device using the wide beam, and determine whether to perform beam reselection based on the difference between the first reception capability and the second reception capability.

According to various embodiments, the at least one processor may be configured to reselect the transmission beam pattern and the reception beam pattern when the difference between the first reception capability and the second reception capability is smaller than a reference value and to maintain the transmission beam pattern and the reception beam pattern when the difference between the first reception capability and the second reception capability is larger than the reference value.

According to various embodiments, the at least one processor may be configured to form a wide beam by combining signals sequentially received through the plurality of antennas.

Figure 3:
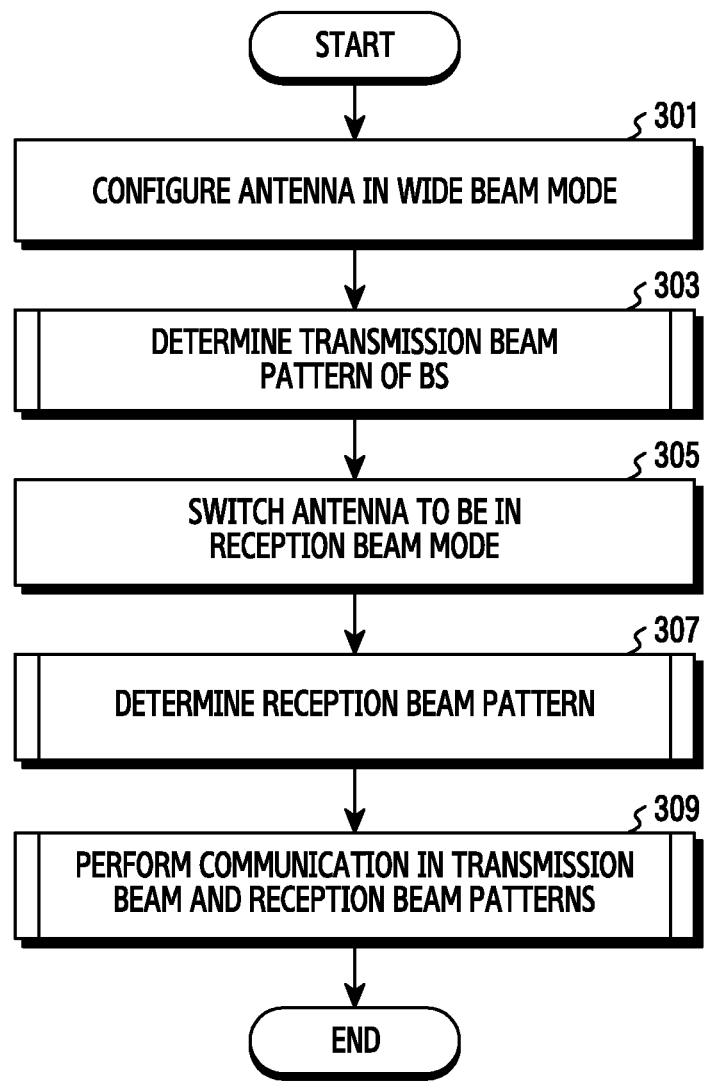
FIG. 3 is a flowchart illustrating an operation in which the electronic device selects a beam pattern according to various embodiments of the present disclosure.
Figure 4:
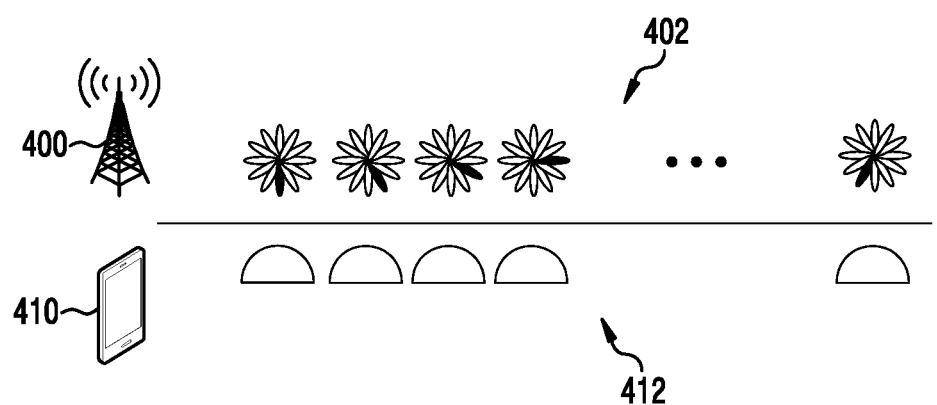
FIG. 4 is a diagram illustrating an example in which the electronic device selects a transmission beam pattern according to various embodiments of the present disclosure.

FIG. 3 is a flowchart illustrating an operation in which the electronic device selects a beam pattern according to various embodiments of the present disclosure. FIG. 4 is a diagram illustrating an example in which the electronic device selects a transmission beam pattern according to various embodiments of the present disclosure. In the following description, the electronic device may include the electronic device 201 or at least a part (for example, the processor 220) of the electronic device 201 of FIG. 2.

Referring to FIG. 3, the electronic device may configure at least one antenna in a wide-beam mode in operation 301. For example, the processor 220 may control the communication module 260 to form a wide reception beam by activating at least one antenna element (for example, three antenna elements) among the antenna elements included in the antenna. For example, the processor 220 may control the communication module 260 to form the wide reception beam by activating at least one antenna element for each antenna module 140, 142, 144, or 146 illustrated in FIG. 1B. For example, the processor 220 may control the communication module 260 to form the wide reception beam by activating at least one antenna element included in at least one antenna among the plurality of antenna modules 140 to 146 illustrated in FIG. 1B. For example, the processor 220 may control the communication module 260 to switch the antenna of the electronic device 201 to a dedicated antenna for forming the wide beam. For example, the processor 220 may control the communication module 260 to activate at least one antenna to be used for forming the wide beam among antennas for forming beams in different directions, included in each antenna module 140, 142, 144, or 146. For example, the wide-beam mode may be configured or switched at a time point at which the electronic device selects a beam pattern or at which a received signal strength becomes equal to or lower than a reference strength. The received signal strength may become equal to or lower than the reference strength as the beam pattern with the BS is changed.

The electronic device may determine a transmission beam pattern of the BS (transmitting side) through the wide reception beam in operation 303. For example, a BS 400 may sequentially transmit synchronization signals 402 to which respective transmission beam patterns are applied based on a transmission time point and a transmission period of the synchronization signal, as illustrated in FIG. 4. An electronic device 410 (for example, the processor 220) may receive the synchronization signals to which different transmission beam patterns are applied through the wide reception beam as indicated by reference numeral 412. The electronic device 410 (for example, the processor 220) may determine that the transmission beam pattern applied to the synchronization signal having the largest received signal strength is the transmission beam pattern of the BS 400. For example, the processor 220 may control the communication module 260 to transmit transmission beam pattern information of the BS to the BS. For example, the electronic device 410 may acquire synchronization signal information from the BS 400 at the time point at which the electronic device 410 accesses the BS 400. For example, the synchronization signal information may include at least one of the number of available beam patterns of the BS, the transmission time point of the synchronization signal, the transmission interval of the synchronization signal, and the transmission period of the synchronization signal.

The electronic device may switch the mode of at least one antenna to a reception beam mode in operation 305. For example, the processor 220 may control the communication module 260 to form a reception beam by activating a plurality of antenna elements included in the antenna. For example, the processor 220 may control the communication module 260 to switch a driving antenna of the electronic device 201 from a dedicated antenna for forming the wide beam to an antenna for forming a reception beam.

The electronic device may determine a reception beam pattern of the electronic device for receiving a signal from the BS in operation 307. For example, the processor 220 may receive a synchronization signal through each reception beam pattern in every transmission period of the synchronization signal of the BS. The processor 220 may select the synchronization signal having the largest received signal strength (for example, the RSSI) as the reception beam pattern of the electronic device 201. For example, the processor 220 may receive the synchronization signal by forming a plurality of reception beams in different patterns in every transmission period of the synchronization signal. For example, the processor 220 may determine the reception beam pattern through at least one antenna corresponding to the direction in which the signal is received from the BS. For example, the processor 220 may select at least one antenna corresponding to the direction in which the signal is received from the BS based on the signal strength acquired through the wide beam.

The electronic device may communicate with the BS through beamforming technology based on the transmission beam pattern of the BS and the reception beam pattern of the electronic device in operation 309. For example, the processor 220 may receive, from the BS, the signal, to which the transmission beam pattern determined in operation 303 is applied, through the reception beam pattern determined in operation 307.

Figure 5:
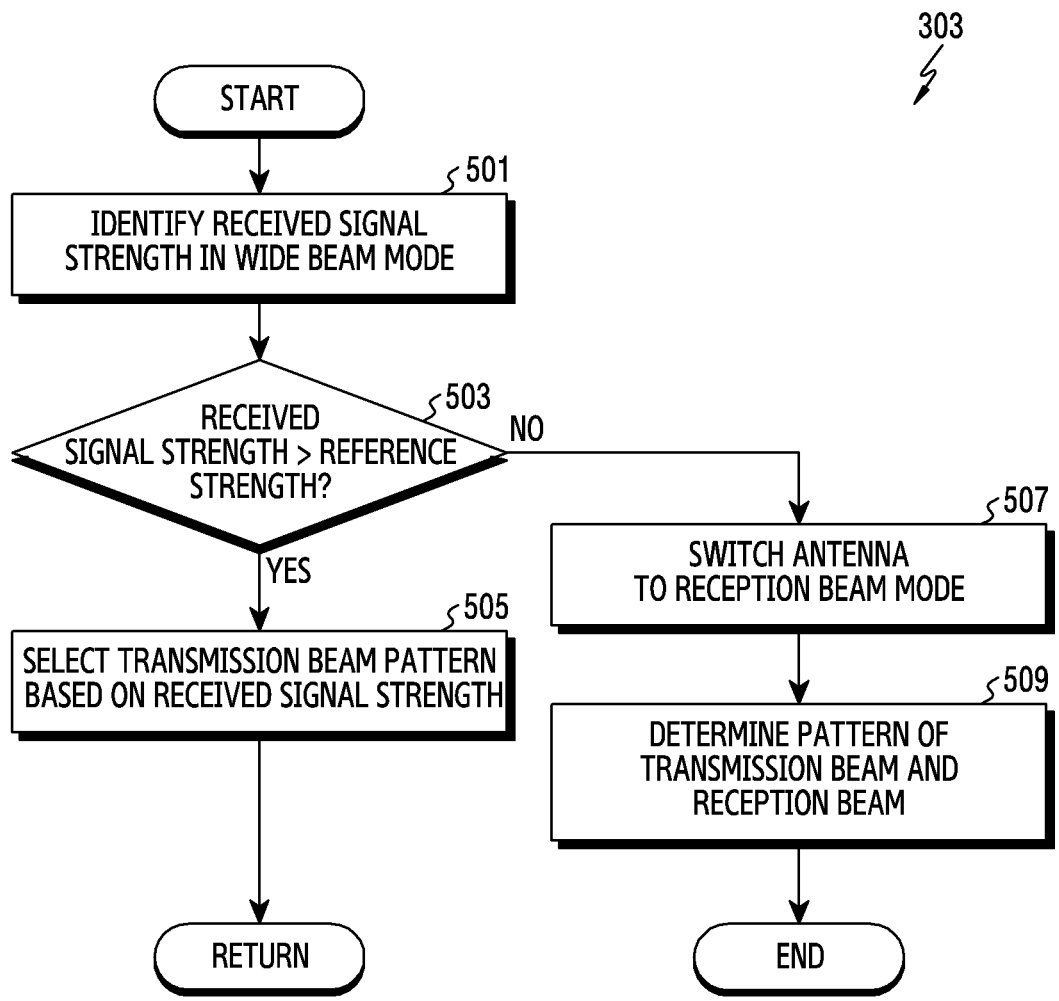
FIG. 5 is a flowchart illustrating an operation in which the electronic device selects a transmission beam pattern through a wide beam according to various embodiments of the present disclosure.

FIG. 5 is a flowchart illustrating an operation in which the electronic device selects a transmission beam pattern through the wide beam according to various embodiments of the present disclosure. Hereinafter, the operation for determining the transmission beam pattern of the BS in operation 303 of FIG. 3 will be described. In the following description, the electronic device may include the electronic device 201 or at least a part (for example, processor 220) of the electronic device 201 of FIG. 2.

Referring to FIG. 5, when the antenna is configured in the wide-beam mode, the electronic device may identify (determine) the strength of a signal received through the wide beam in operation 501. For example, when receiving a synchronization signal transmitted from the BS through the wide reception beam, the processor 220 may identify the strength of the received signal.

The electronic device may identify (determine) whether the received signal strength using the wide beam is greater than a reference strength in operation 503. For example, the processor 220 may compare the received signal strength using the wide beam with the reference strength in order to identify whether the determination of the transmission beam pattern using the wide beam is reliable. For example, the received signal strength using the wide beam may include the mean of strengths of signals received through the wide beam during one period in which the BS transmits the synchronization signal or the largest strength of the signal received through the wide beam.

When the received signal strength using the wide beam is greater than the reference signal strength, the electronic device may select the transmission beam pattern of the BS based on the strength of the signal to which each transmission beam pattern received through the wide beam is applied in operation 505. For example, when the received signal strength using the wide beam is greater than the reference signal strength, the processor 220 may determine that the selection of the transmission beam pattern using the wide beam is reliable. Accordingly, the processor 220 may select the transmission beam pattern applied to the signal having the greatest received signal strength among the signals received through the wide reception beam as the transmission beam pattern of the BS. For example, the BS may sequentially transmit synchronization signals to which different transmission beam patterns are applied from the time point at which the synchronization signal is transmitted. Accordingly, the processor 220 may determine the transmission beam pattern applied to the corresponding synchronization signal based on the time elapsed from the time point at which the BS transmits the synchronization signal.

When the received signal strength using the wide beam is equal to or less than the reference signal strength, the electronic device may switch at least one antenna to the reception beam mode in operation 507. For example, when the received signal strength using the wide beam is equal to or less than the reference signal strength, the processor 220 may determine that the selection of the transmission beam pattern using the wide beam is not reliable. Accordingly, in order to compare each transmission beam pattern with a corresponding reception beam pattern, the processor 220 may control the communication module 260 to switch at least one antenna to the reception beam mode. For example, the reception beam mode may include an operation mode for receiving data from the BS through a reception beam having a relatively narrower beam width than that of the wide beam.

The electronic device may determine the transmission beam pattern of the BS and the reception beam pattern of the electronic device by comparing received signal strengths for combinations of the transmission beam patterns and the reception beam patterns in operation 509. For example, the processor 220 may detect the received signal strength for the combination of the transmission beam pattern and the reception beam pattern by changing the reception beam pattern of the electronic device 201 at every transmission period of the synchronization signal. The processor 220 may select the transmission beam pattern and the reception beam pattern included in the combination having the largest received signal strength as the transmission beam pattern of the BS and the reception beam pattern of the electronic device 201. For example, the processor 220 may select at least one antenna to be used for configuring the beam pattern in the antenna module used for forming the wide beam based on the signal strength measured using the wide beam. The processor 220 may determine the transmission beam pattern of the BS and the reception beam pattern of the electronic device 201 through at least one antenna selected using the wide beam. For example, the processor 220 may select the antenna having the largest received signal strength as the antenna to be used for configuring the beam pattern based on the signal strength measured through the wide beam. The antenna to be used for configuring the beam pattern may include an antenna (for example, the first antenna 144-1, the second antenna 144-2, or the fifth antenna 144-3 of FIG. 1C) for forming a beam in the direction in which a signal is received from the BS in an antenna module (for example, the third antenna module 144 of FIG. 1B) used for forming the wide beam by the electronic device 201. For example, the processor 220 may limit an operation of finding the beam pattern through an antenna which has not been selected in the antenna module used for forming the wide beam.

Figure 6:
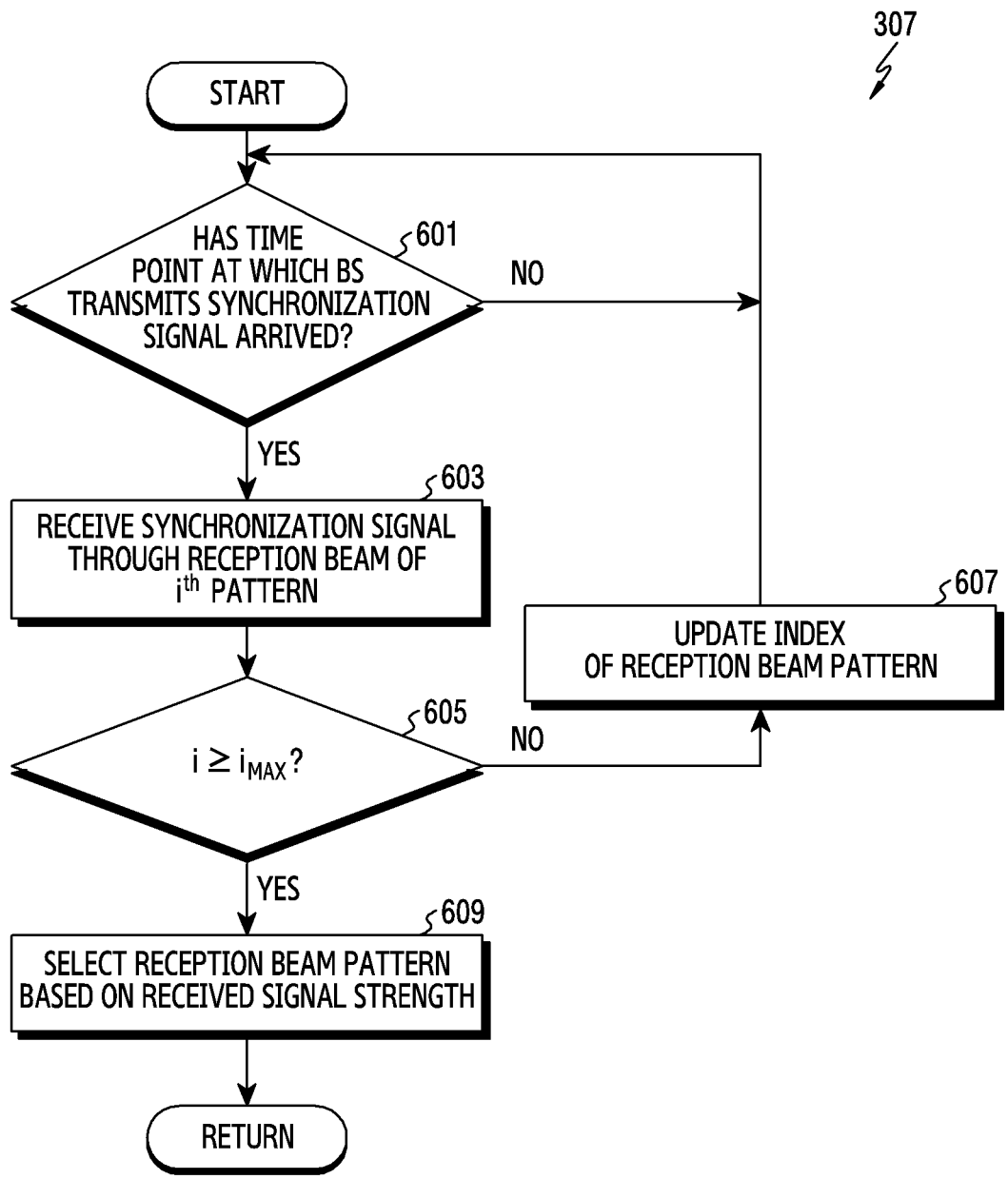
FIG. 6 is a flowchart illustrating an operation in which the electronic device selects a reception beam pattern according to various embodiments of the present disclosure.
Figure 7:
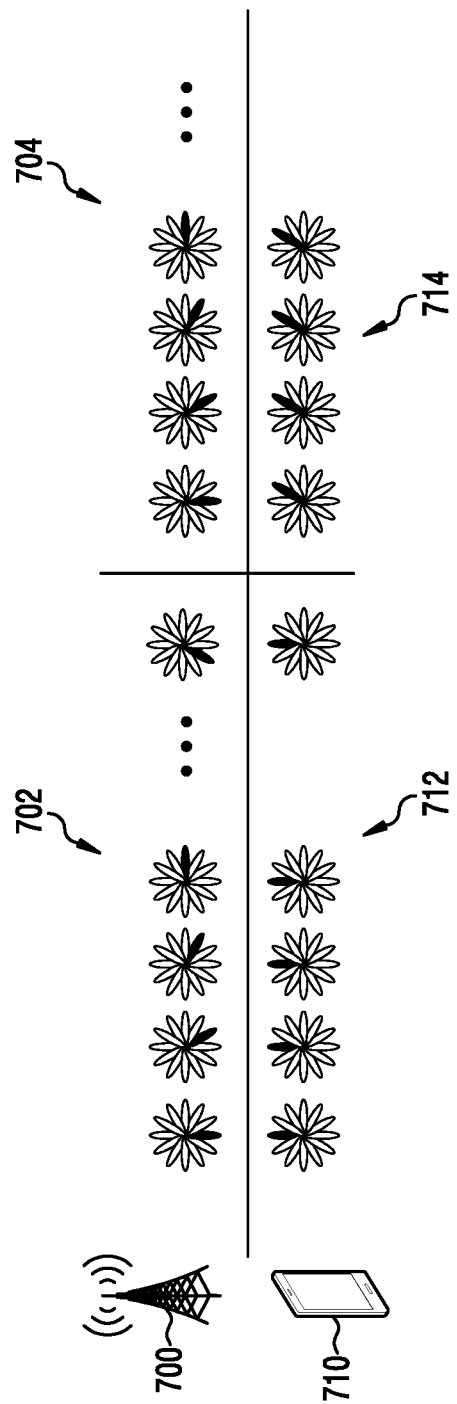
FIG. 7 is a diagram illustrating an example in which the electronic device selects a reception beam pattern according to various embodiments of the present disclosure.

FIG. 6 is a flowchart illustrating an operation in which the electronic device selects a reception beam pattern according to various embodiments of the present disclosure. FIG. 7 is a diagram illustrating an example in which the electronic device selects the reception beam pattern according to various embodiments of the present disclosure. Hereinafter, the operation for determining the reception beam pattern of the electronic device in operation 307 of FIG. 3 will be described. In the following description, the electronic device may include the electronic device 201 or at least a part (for example, processor 220) of the electronic device 201 of FIG. 2.

Referring to FIG. 6, when the electronic device switches the antenna to the reception beam mode (for example, operation 305 of FIG. 3), in operation 601 the electronic device may identify (determine) whether a transmission period of the synchronization signal for the BS has arrived. For example, the transmission period of the synchronization signal may be received from the BS in an access process of the BS.

When the transmission period of the synchronization signal has not arrived, the electronic device may continuously identify whether the transmission period of the synchronization signal has arrived.

When the transmission period of the synchronization signal arrives, the electronic device may receive the synchronization signal through a reception beam of an $i^{th}$ pattern in operation 603. For example, i may include 0, which is an index indicating the pattern of the reception beam, as an initial value. For example, a BS 700 may sequentially transmit synchronization signals to which the transmission beam of the pattern that can be used by the BS 700 is applied in every transmission period of the synchronization signal, as indicated by reference numerals 702 and 704 of FIG. 7. An electronic device 710 (for example, the processor 220) may receive the synchronization signal by changing the reception beam pattern in every transmission period of the synchronization signal, as indicated by reference numerals 712 and 714. For example, the electronic device 710 may receive the synchronization signal through the reception beam of the $i^{th}$ pattern during a transmission period 702 of an $m^{th}$ synchronization signal, as indicated by reference numeral 712, and may receive the synchronization signal through the reception beam of an $i+1^{th}$ pattern during a transmission period 704 of an $m+1^{th}$ synchronization signal, as indicated by reference numeral 714. For example, the processor 220 may control the communication module 260 to receive only the synchronization signal to which the transmission beam pattern of the BS 700 is applied during the transmission period of the synchronization signal.

The electronic device may identify (determine) whether the index (i) of the reception beam pattern in which the synchronization signal is received is greater than or equal to a maximum index (iMAX) in operation 605. For example, the processor 220 may compare the index (i) of the reception beam pattern in which the synchronization signal is received in operation 603 with the maximum index (iMAX) in order to identify whether the synchronization signal is received through beams of all patterns that can be used by the electronic device 201.

When the index (i) of the reception beam pattern in which the synchronization signal is received is less than the maximum index (iMAX), the electronic device may update the index of the reception beam pattern in operation 607. For example, when the index (i) of the reception beam pattern in which the synchronization signal is received is smaller than the maximum index (iMAX), the processor 220 may determine that there is a reception beam pattern in which the synchronization signal is not received. Accordingly, the processor 220 may change the index of the reception beam pattern by one stage (for example, i++).

When the index (i) of the reception beam pattern in which the synchronization signal is received is greater than or equal to the maximum index (iMAX), the electronic device may select the reception beam pattern of the electronic device based on the received signal strength of the reception beam pattern in operation 609. For example, when the index (i) of the reception beam pattern in which the synchronization signal is received is larger than or equal to the maximum index (iMAX), the processor 220 may determine that the synchronization signal is received through all reception beam patterns. Accordingly, the processor 220 may select the reception beam pattern having the largest received signal strength as the reception beam pattern to be used by the electronic device 201 for receiving the signal from the BS. For example, the received signal strength of the reception beam pattern may include the largest received signal strength among signal strengths of a plurality of synchronization signals received through the corresponding reception beam pattern. For example, the received signal strength of the reception beam pattern may include the strength of the synchronization signal to which the transmission beam pattern of the BS is applied, received through the corresponding reception beam pattern.

Figure 8:
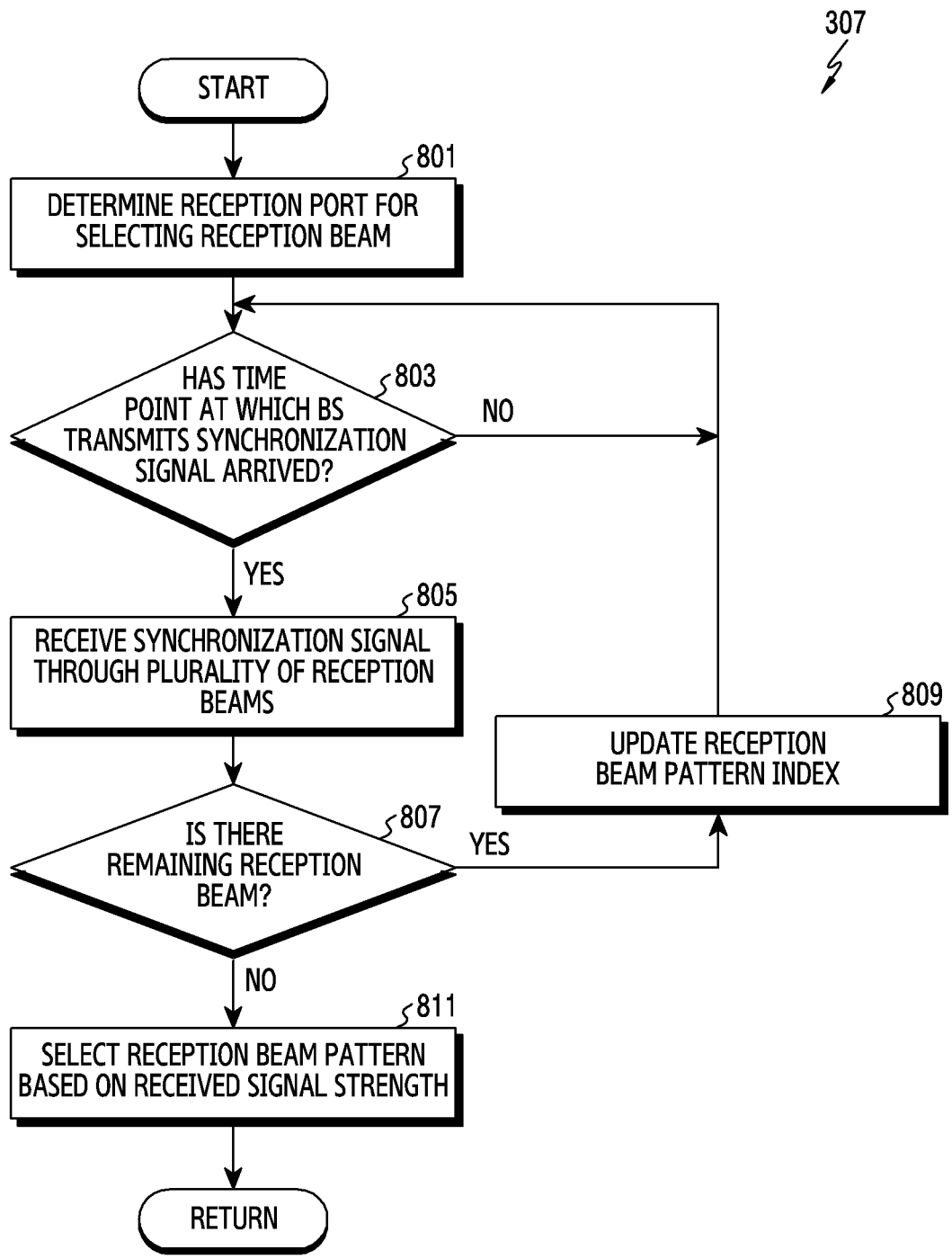
FIG. 8 is a flowchart illustrating an operation in which the electronic device selects a reception beam pattern through a plurality of reception ports according to various embodiments of the present disclosure.
Figure 9:
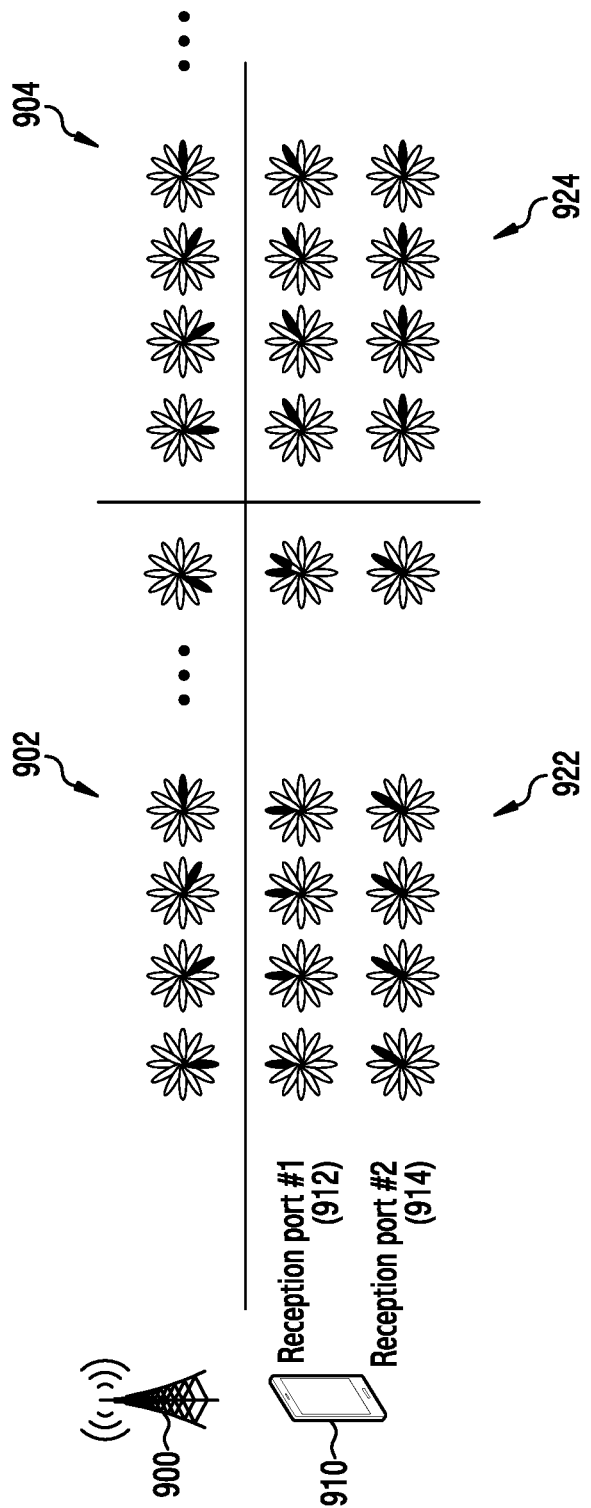
FIG. 9 is a diagram illustrating an example in which the electronic device selects a reception beam pattern through a plurality of reception ports according to various embodiments of the present disclosure.

FIG. 8 is a flowchart illustrating an operation in which the electronic device selects a reception beam pattern through a plurality of reception ports according to various embodiments of the present disclosure. FIG. 9 is a diagram illustrating an example in which the electronic device selects a reception beam pattern through a plurality of reception ports according to various embodiments of the present disclosure. Hereinafter, the operation for determining the reception beam pattern of the electronic device in operation 307 of FIG. 3 will be described. In the following description, the electronic device may include the electronic device 201 or at least a part (for example, processor 220) of the electronic device 201 of FIG. 2.

Referring to FIG. 8, when the electronic device switches the antenna to the reception beam mode (for example, operation 305 of FIG. 3), the electronic device may determine a reception port for selecting a reception beam in operation 801. For example, the processor 220 may select a reception port to be used for selecting the reception beam based on a reception capability (for example, RSRP) of the antenna corresponding to each reception port. For example, the processor 220 may determine at least one reception port having an antenna reception capability larger than a reference capability as the reception port to be used for selecting the reception beam.

The electronic device may identify (determine) whether a synchronization signal transmission period of the BS that the electronic device accesses has arrived in operation 803. For example, when the electronic device accesses the BS through the communication module 260, the processor 220 may receive synchronization signal information from the BS. For example, the synchronization signal information may include at least one of the number of available beam patterns of the BS, a transmission time point of the synchronization signal (sync signal), and a transmission period of the synchronization signal.

When the synchronization signal transmission period has not arrived, the electronic device may identify (determine) whether the synchronization signal transmission period has arrived in operation 803.

When the synchronization signal transmission period arrives, the electronic device may receive the synchronization signal through a plurality of reception beams of different patterns configured in the reception port in operation 805. For example, a BS 900 may sequentially transmit synchronization signals to which the transmission beam of the pattern that can be used by the BS 900 is applied in every synchronization signal transmission period, as indicated by reference numerals 902 and 904 of FIG. 9. An electronic device 910 (for example, the processor 220) may receive the synchronization signal by changing the reception beam pattern of at least one reception port (for example, reception port #1 912 and reception port #2 914) in every synchronization signal transmission period. For example, the electronic device 910 may receive the synchronization signal through a reception beam of an $i^{th}$ pattern configured in the reception port #1 912 and a reception beam of an $i+1^{th}$ pattern configured in the reception port #2 914 during a transmission period 902 of an $m^{th}$ synchronization signal, as indicated by reference numeral 922. The electronic device 910 may receive the synchronization signal through a reception beam of an $i+2^{th}$ pattern configured in the reception port #1 912 and a reception beam of an $i+1^{th}$ pattern configured in the reception port #2 914 during a transmission period 904 of an m+1$^{th}$ synchronization signal, as indicated by reference numeral 924. For example, the processor 220 may control the communication module 260 to receive only the synchronization signal to which the transmission beam pattern of the BS 700 is applied through each reception beam pattern.

The electronic device may identify (determine) whether there are remaining reception beam patterns in which the synchronization signal is not received among the beams of all patterns that can be used by the electronic device in operation 807. For example, the processor 220 may compare an index (for example, i+1) of the reception beam pattern in which the synchronization signal is received in operation 807 with a maximum index (iMAX) in order to identify whether the synchronization signal is received through beams of all patterns that can be used by the electronic device 201.

When there are remaining reception beam patterns, the electronic device may update the index of the reception beam pattern in operation 809. For example, when the index (i+1) of the reception beam pattern in which the synchronization signal is received is smaller than the maximum index (iMAX), the processor 220 may determine that there is a reception beam pattern in which the synchronization signal is not received. The processor 220 may change the index of the reception beam pattern by one stage (for example, i=i+2).

When there is no remaining reception beam pattern, the electronic device may select the reception beam pattern of the electronic device based on the received signal strength of the reception beam pattern in operation 811. For example, the processor 220 may select the reception beam pattern having the largest received signal strength as the reception beam pattern to be used by the electronic device 201 for receiving the signal from the BS. For example, the received signal strength of the reception beam pattern may include the largest received signal strength among signal strengths of a plurality of synchronization signals received through the corresponding reception beam pattern. For example, the received signal strength of the reception beam pattern may include the strength of the synchronization signal to which the transmission beam pattern of the BS is applied, received through the corresponding reception beam pattern.

According to an embodiment, the electronic device 201 may determine the reception beam pattern of the electronic device 201 through the wide beam. For example, when the synchronization signal is received to determine the reception beam pattern of the electronic device 201, the processor 220 may receive the synchronization signal by forming an antenna corresponding to at least one of a plurality of reception ports through the wide beam. The processor 220 may detect a difference between the received signal strength of each reception beam pattern with the received signal strength of the wide beam. The processor 220 may select the reception beam pattern of the electronic device 201 based on the difference between the received signal strength of each reception beam pattern and the received signal strength of the wide beam.

Figure 10:
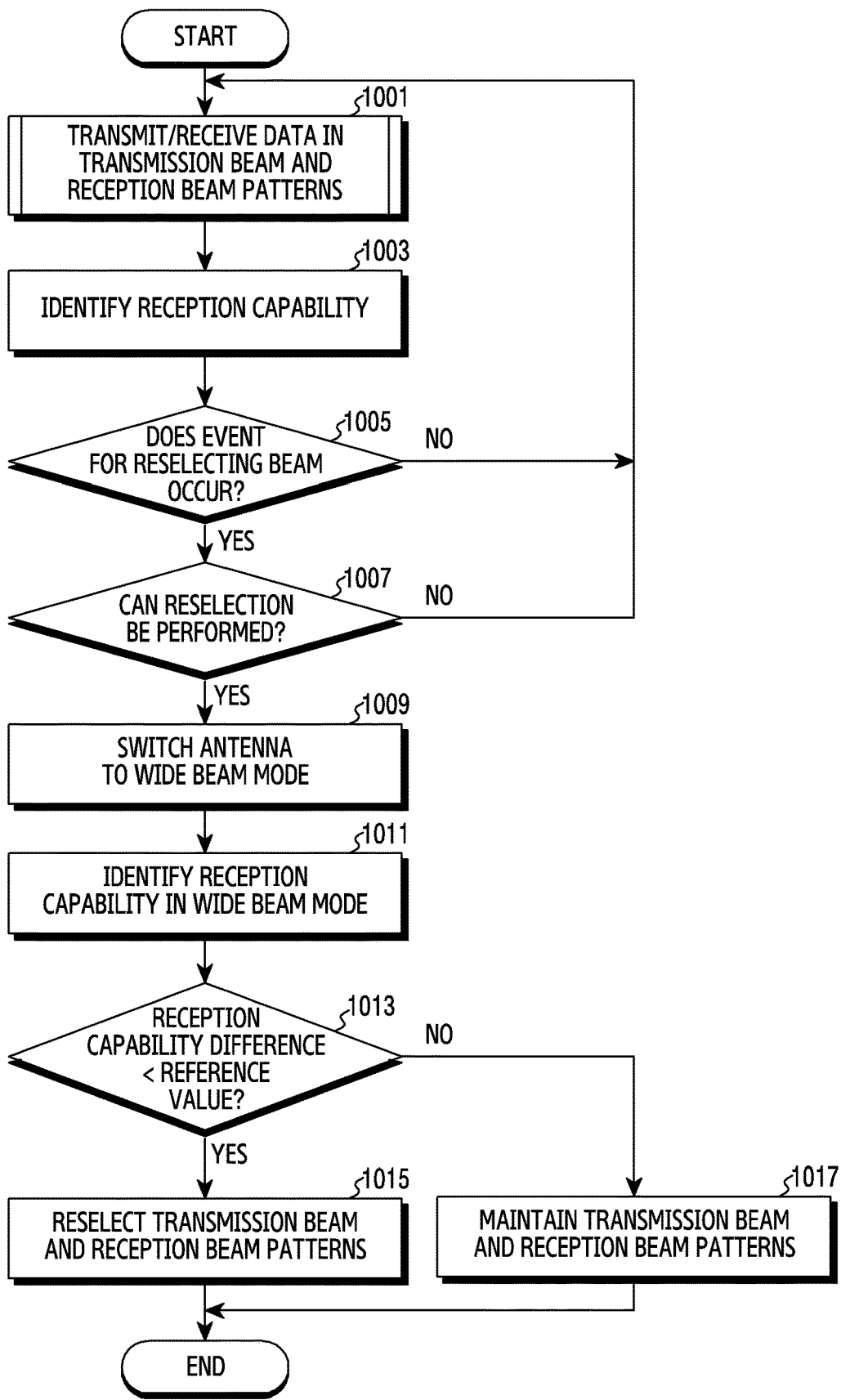
FIG. 10 is a flowchart illustrating an operation in which the electronic device reselects a beam pattern according to various embodiments of the present disclosure.

FIG. 10 is a flowchart illustrating an operation in which the electronic device re-selects a beam pattern according to various embodiments of the present disclosure. In the following description, the electronic device may include the electronic device 201 or at least a part (for example, the processor 220) of the electronic device 201 of FIG. 2.

Referring to FIG. 10, the electronic device may communicate (for example, transmit/receive data) with the BS through the transmission beam pattern of the BS and the reception beam pattern of the electronic device in operation 1001. For example, as illustrated in operations 301 to 309 of FIG. 3, the processor 220 may control the communication module 260 to receive the signal to which the transmission beam pattern of the BS is applied through the reception beam pattern of the electronic device 201.

The electronic device may identify a reception capability (for example, at least one of the RSRP and the RSSI) of the electronic device through the transmission beam pattern of the BS and the reception beam pattern of the electronic device in operation 1003. For example, the processor 220 may identify the strength of the signal to which the transmission beam pattern of the BS receiving the reception beam pattern of the electronic device 201 is applied.

The electronic device may identify (determine) whether an event for re-selecting a beam occurs based on the reception capability of the electronic device in operation 1005. For example, when the mean of the received signal strengths measured in a predetermined time is smaller than a reference value, the processor 220 may determine that the event for re-selecting the beam occurs. For example, when a received signal strength smaller than the reference value is detected a predetermined number of times or more in the predetermined time, the processor 220 may determine that the event for re-selecting the beam occurs.

When the event for re-selecting the beam does not occur, the electronic device may maintain communication with the BS through the transmission beam pattern of the BS and the reception beam pattern of the electronic device in operation 1001.

When the event for re-selecting the beam occurs, the electronic device may identify (determine) whether beam reselection can be performed in operation 1007. For example, the processor 220 may identify whether the user grips the electronic device 201. For example, when the electronic device 201 is gripped by the user, the processor 220 may determine that the beam cannot be formed in the form requested by the electronic device 201. Accordingly, when the electronic device 201 is gripped by the user, the processor 220 may determine not to perform beam reselection. For example, the processor 220 may identify a multipath environment. In the case of the multipath environment, the processor 220 may determine that a difference in the signal strength between the reception beam and the wide beam cannot be expected, and thus determine not to perform beam reselection. For example, the processor 220 may periodically identify the reception capability of each of a plurality of reception beam patterns supported by the electronic device 201. When there is a plurality of reception beam patterns in which a signal having a strength larger than or equal to the reference strength is received, the processor 220 may determine that a multipath environment exists. For example, whether the user grips the electronic device may be determined based on contact information detected through at least one grip sensor disposed on at least part of the electronic device 201.

When it is determined not to perform beam reselection, the electronic device may maintain communication with the BS through the transmission beam pattern of the BS and the reception beam pattern of the electronic device in operation 1001.

When it is determined to perform beam reselection, the electronic device may switch at least one antenna to the wide-beam mode in operation 1009. For example, the processor 220 may control the communication module 260 to activate at least one antenna element (for example, three antenna elements) of the antenna elements included in the antenna. In this case, the wide beam may be formed through a combination of the antenna elements. For example, the processor 220 may control the communication module 260 to switch the driving antenna of the electronic device 201 to the dedicated antenna for forming the wide beam. For example, the processor 220 may control the communication module 260 to activate at least one antenna for forming beams in different directions within each antenna module 140, 142, 144, or 146.

The electronic device may identify the reception capability in the wide beam in operation 1011. For example, the processor 220 may identify the received signal strength of the signal received through the wide reception beam or a change in the signal strength. For example, the change in the signal strength may include a change in the signal strength measured through the wide beam for a predetermined time or a change in the signal strength from a previous scan interval.

The electronic device may identify (determine) whether a difference between the reception capability of the reception beam pattern of the electronic device and the reception capability of the wide beam is less than a reference value. For example, the processor 220 may compare the difference between the received signal strength of the reception beam pattern of the electronic device 201 and the received signal strength of the wide beam with the reference value. For example, the processor 220 may compare the difference between the change in the received signal strength of the reception beam pattern of the electronic device 201 and the change in the received signal strength of the wide beam with the reference value. For example, the reference value is a reference for determining whether to perform beam reselection, and may be determined based on an antenna array gain of the electronic device 201 and a hysteresis value. For example, the hysteresis value may be configured to be lower as the change in the wireless channel environment is larger. For example, the reference value may be configured as different values depending on the form of the beam.

When the difference between the reception capability of the reception beam pattern of the electronic device and the reception capability of the wide beam is less than the reference value, the electronic device may reselect the transmission beam pattern and the reception beam pattern in operation 1015. For example, when the difference between the reception capability of the reception beam pattern of the electronic device and the reception capability of the wide beam is smaller than the reference value, the processor 220 may determine that the reception capability of the electronic device 201 deteriorates due to the use of the wrong beam. Accordingly, the processor 220 may reselect the transmission beam pattern of the BS and the reception beam pattern of the electronic device 201. For example, the processor 220 may reselect the transmission beam pattern of the BS and the reception beam pattern of the electronic device 201 as illustrated in operations 301 to 307 of FIG. 3. For example, when the reception capability of the reception beam pattern of the electronic device is lower than the reception capability of the wide beam, reselection of the transmission beam pattern and the reception beam pattern may be performed.

When the difference between the reception capability of the reception beam pattern of the electronic device and the reception capability of the wide beam is greater than or equal to the reference value, the electronic device may maintain the transmission beam pattern and the reception beam pattern in operation 1017. For example, when the difference between the reception capability of the reception beam pattern of the electronic device and the reception capability of the wide beam is larger than or equal to the reference value, the processor 220 may determine that the reception capability of the electronic device 201 deteriorates due to an external factor (for example, a grip or a user's movement). Accordingly, the processor 220 may control the communication module 260 to maintain the transmission beam pattern of the BS and the reception beam pattern of the electronic device 201. For example, the processor 220 may control the communication module 260 to transmit the signal making a request for amplifying a transmission strength of the transmission signal to the BS.

According to various embodiments of the present disclosure, the electronic device may determine whether to reselect the beam in the multipath environment. For example, when the processor 220 recognizes the number and directions of paths in which signals are received in the multipath environment, the processor 220 may determine whether to perform beam reselection using the wide beam. In this case, the processor 220 may configure a reference value for determining whether to perform beam reselection based on the number and directions of the paths in which the signals are received.

Figure 11C:
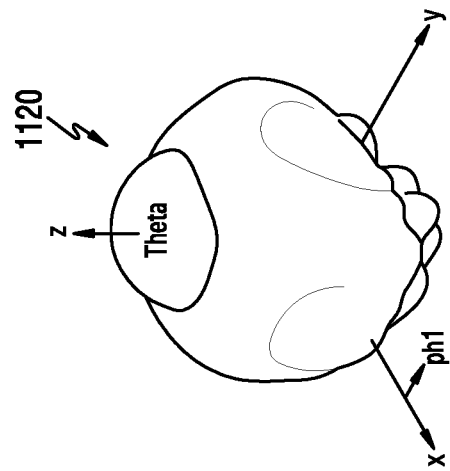
FIGS. 11A, 11B and 11C are diagrams illustrating a beam pattern of a first antenna according to various embodiments of the present disclosure.
Figure 11B:
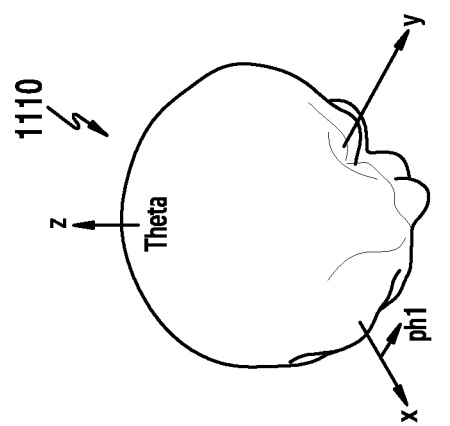
Figure 11A:
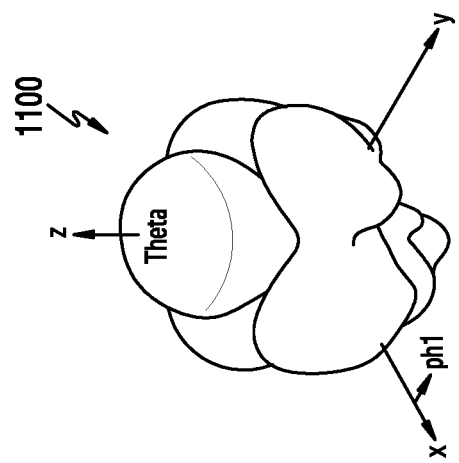

FIGS. 11A, 11B and 11C are diagrams illustrating beam patterns of a first antenna according to various embodiments of the present disclosure.

According to an embodiment, the first antenna (for example, the first antenna 144-1 of FIG. 1C) included in the antenna module 140, 142, 144, or 146 may form a reception beam in a rearward direction of the electronic device 201, as indicated by reference numeral 1100 of FIG. 11A. When the first antenna forms the reception beam, the gain in the direction of the beam is large, so the reception gain of the signal in the direction of the beam is improved, but the signal may not be received in the remaining directions.

According to an embodiment, the first antenna (for example, the first antenna 144-1 of FIG. 1C) may form a wide beam in a rearward direction of the electronic device 201, as indicated by reference numeral 1110 of FIG. 11B. When the first antenna forms the wide beam, the range in which the signal can be received is wider than that of the reception beam, but the overall reception gain may be reduced compared to the reception beam. For example, the electronic device 201 may configure a reference value, which is a reference to determine whether to perform beam reselection based on the difference 1120 in a reception gain between the reception beam and the wide beam, as illustrated in FIG. 11C.

Figure 12A:
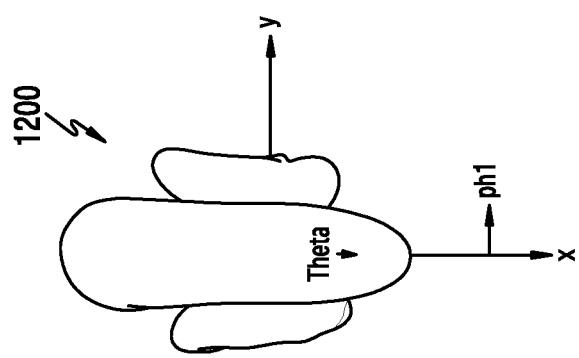
FIGS. 12A, 12B and 12C are diagrams illustrating a beam pattern of a second antenna according to various embodiments of the present disclosure.
Figure 12B:
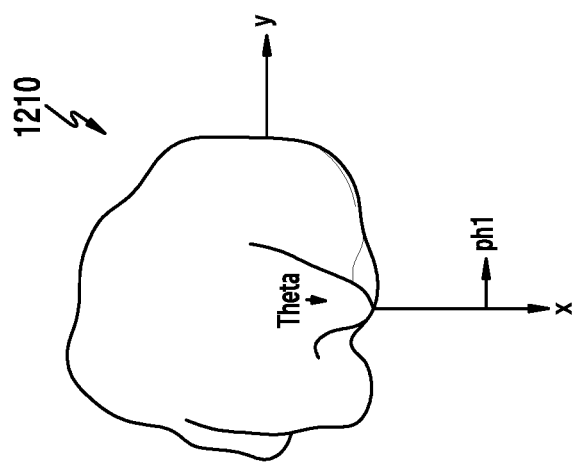
Figure 12C:
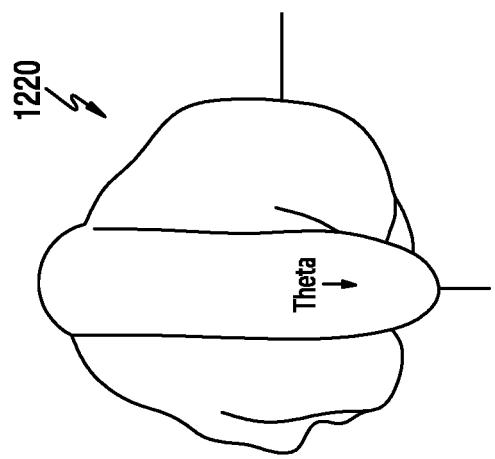

FIGS. 12A, 12B and 12C are diagrams illustrating beam patterns of a second antenna according to various embodiments of the present disclosure.

According to an embodiment, the second antenna (for example, the second antenna 144-2 of FIG. 1C) included in the antenna module 140, 142, 144, or 146 may form a reception beam in the leftward direction of the electronic device 201, as indicated by reference numeral 1200 of FIG. 12A. Since the reception beam formed through the second antenna has a large gain in the direction of the beam, the reception gain of the signal in the direction of the beam may be improved, but the signal may not be received in the remaining directions.

According to an embodiment, the second antenna (for example, the second antenna 144-2 of FIG. 1C) may form a wide beam in the leftward direction of the electronic device 201, as indicated by reference numeral 1210 of FIG. 12B. When the second antenna forms the wide beam, the range in which the signal can be received is wider than that of the reception beam, but the overall reception gain may be reduced compared to the reception beam. For example, the electronic device 201 may configure a reference value, which is a reference to determine whether to perform beam reselection based on the difference 1220 in the reception gain between the reception beam and the wide beam, as illustrated in FIG. 12C.

Figure 13:
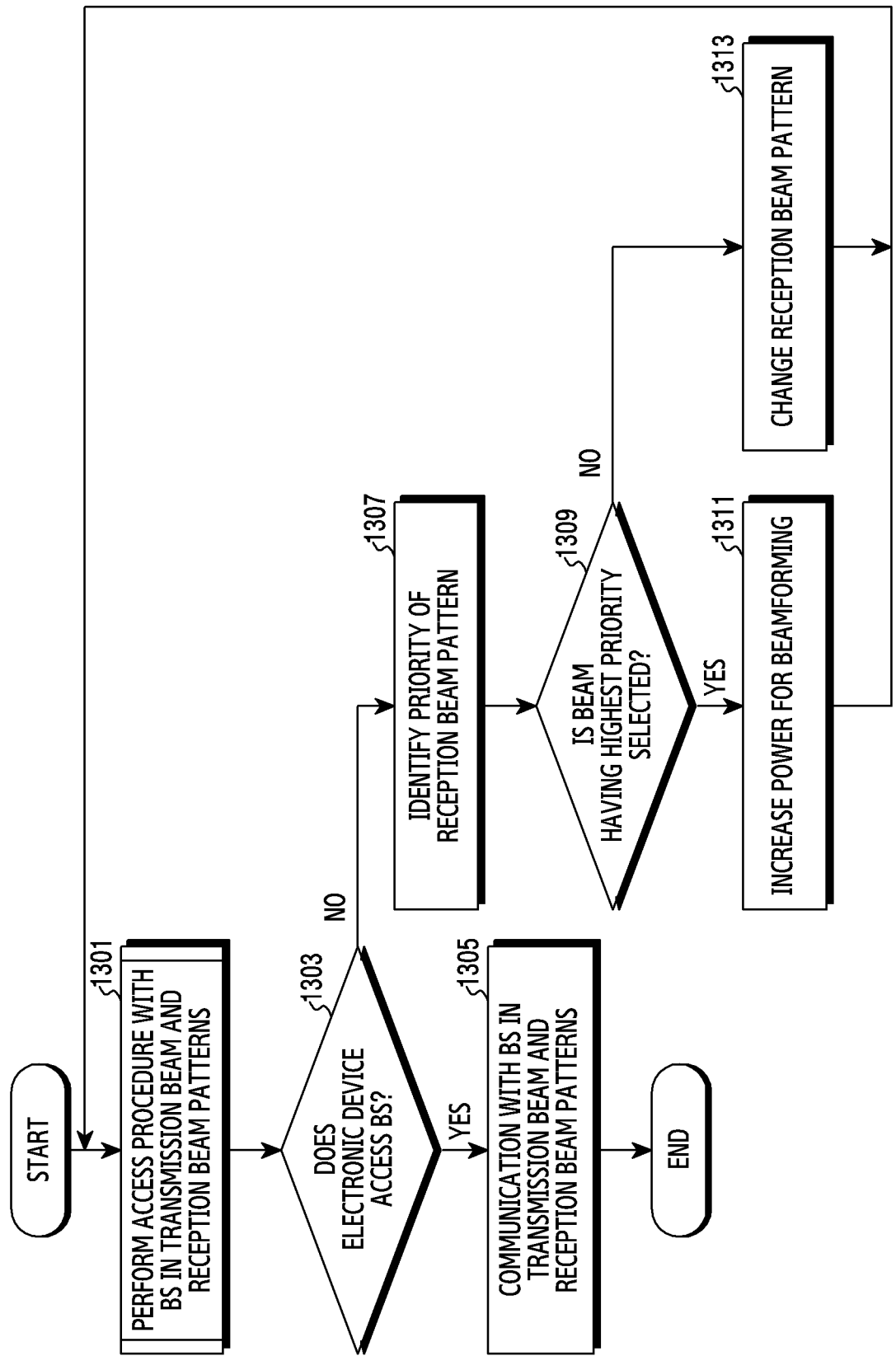
FIG. 13 is a flowchart illustrating an operation in which the electronic device controls a beam based on the priority of a beam pattern according to various embodiments of the present disclosure.
Figure 14A:
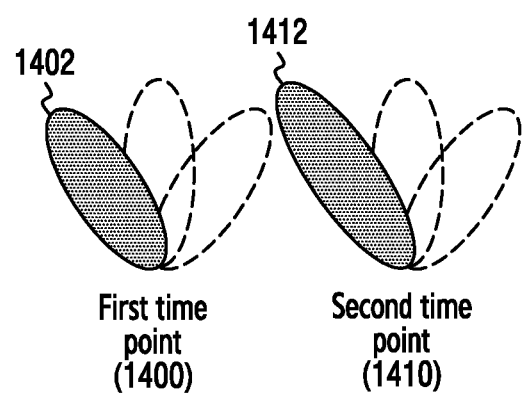
FIG. 14A is a diagram illustrating an example in which the electronic device controls the power of a beam according to various embodiments of the present disclosure.
Figure 14B:
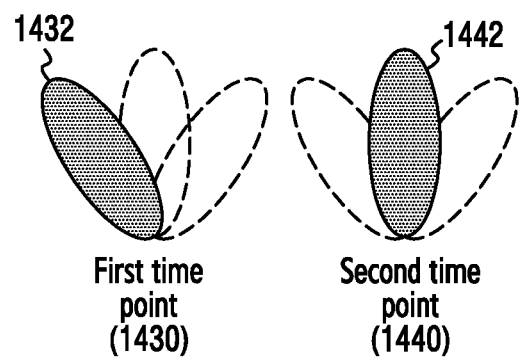
FIG. 14B is a diagram illustrating an example in which the electronic device changes a beam according to various embodiments of the present disclosure.

FIG. 13 is a flowchart illustrating an operation in which the electronic device controls a beam based on the priority of a beam pattern according to various embodiments of the present disclosure. FIG. 14A is a diagram illustrating an example in which the electronic device controls the power of a beam according to various embodiments of the present disclosure. FIG. 14B is a diagram illustrating an example in which the electronic device changes a beam according to various embodiments of the present disclosure. In the following description, the electronic device may include the electronic device 201 or at least a part (for example, processor 220) of the electronic device 201 of FIG. 2.

Referring to FIG. 13, the electronic device may perform an access procedure with the BS through a transmission beam pattern of the BS and a reception beam pattern of the electronic device in operation 1301. For example, as illustrated in operations 301 to 309 of FIG. 3, the processor 220 may perform a Random Access Channel (RACH) procedure to access the BS through the transmission beam pattern of the BS and the reception beam pattern of the electronic device 201.

The electronic device may identify (determine) whether the electronic device accesses the BS through the access procedure with the BS in operation 1303. For example, when a response to a signal transmitted to the BS through the RACH procedure is not received, the processor 220 may determine that the RACH procedure fails.

When the electronic device accesses the BS, the electronic device may communicate with the BS through the transmission beam pattern of the BS and the reception beam pattern of the electronic device in operation 1305. For example, when the RACH procedure with the BS is successful, the processor 220 may transmit/receive data to/from the BS through the transmission beam pattern of the BS and the reception beam pattern of the electronic device 201.

When the electronic device fails to access the BS, the electronic device may identify the priority of a plurality of reception beam patterns that can be supported by the electronic device in operation 1307. For example, the processor 220 may configure the priority of the reception beam pattern based on the difference between the received signal strength of the reception beam pattern and the received signal strength of the wide beam. For example, the processor 220 may configure the priority of the reception beam pattern to be relatively higher as the difference from the received signal strength of the wide beam is larger. For example, the processor 220 may configure the priority by selecting at least one reception beam pattern having received signal strength larger than a reference value among a plurality of reception beam patterns that can be supported by the electronic device 201.

The electronic device may identify (determine) whether the priority of the reception beam pattern used to access the BS is highest in operation 1309. For example, the reception beam pattern used to access the BS may include the reception beam pattern used for the RACH procedure with the BS in operation 1301.

When the priority of the reception beam patterns used to access the BS is highest, the electronic device may increase power for beamforming in the corresponding reception beam pattern without changing the reception beam pattern in operation 1311. For example, the processor 220 may perform the RACH procedure with the BS through a first reception beam pattern at a first time point 1400, as indicated by reference numeral 1402 of FIG. 14A. When the RACH procedure with the BS fails, the processor 220 may identify the priority of the reception beam pattern using the received signal strength of the wide beam. When the priority of the first reception beam pattern is highest, the processor 220 may amplify the power of the first reception beam pattern and again perform the RACH procedure at a second time point 1410, as indicated by reference numeral 1412. For example, the power of the reception beam pattern may increase based on a predefined unit.

When the priority of the reception beam pattern used for access to the BS is not the highest, the electronic device may change the reception beam pattern to be used for access to the BS in operation 1313. For example, the processor 220 may perform the RACH procedure with the BS through a first reception beam pattern 1432 at a first time point 1430, as illustrated in FIG. 14B. When the RACH procedure with the BS fails, the processor 220 may identify the priority of the reception beam pattern using the received signal strength of the wide beam. When the priority of the first reception beam pattern 1432 is not the highest, the processor 220 may perform again the RACH procedure with the BS through a second reception beam pattern 1442, having the highest priority at a second time point 1440.

According to an embodiment, when the electronic device performs the RACH procedure with the BS through the reception beam pattern having the highest priority, the electronic device may change the reception beam pattern based on the number of failures of the RACH procedure. For example, the processor 220 may perform the RACH through the first reception beam pattern having the highest priority, as illustrated in FIG. 14A. When the number of failures of the RACH procedure using the first reception beam pattern is larger than a reference number, the processor 220 may change the reception beam pattern for performing the RACH procedure.

According to an embodiment, when the number of failures of the RACH procedure with the BS using the reception beam pattern having the highest priority is larger than a reference number, the electronic device may determine that access to the corresponding BS fails. For example, the electronic device may output a communication limit message.

Figure 15:
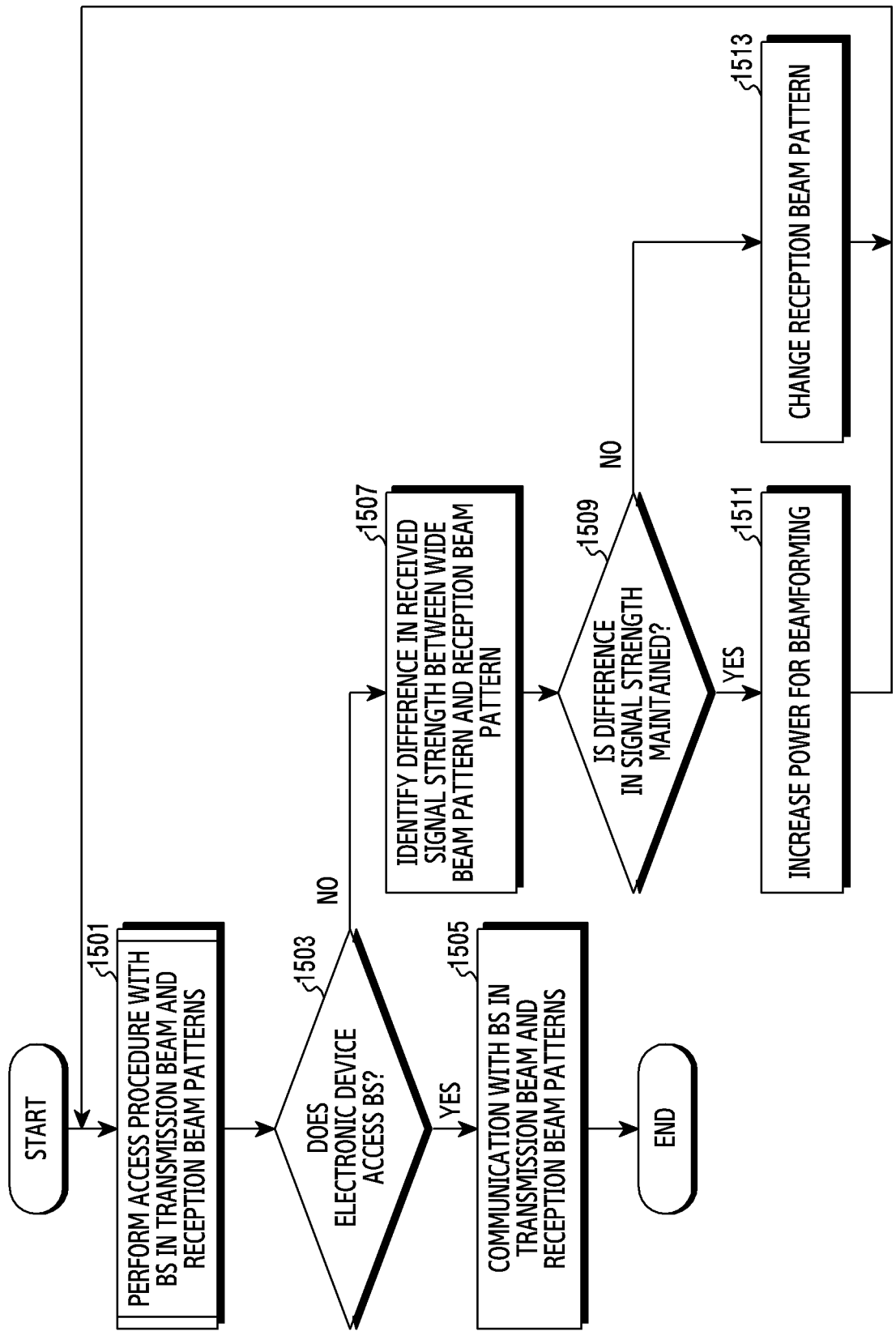
FIG. 15 is a flowchart illustrating an operation in which the electronic device controls a beam based on the received signal strength according to various embodiments of the present disclosure.

FIG. 15 is a flowchart illustrating an operation in which the electronic device controls a beam based on the received signal strength according to various embodiments of the present disclosure. In the following description, the electronic device may include the electronic device 201 or at least a part (for example, the processor 220) of the electronic device 201 of FIG. 2.

Referring to FIG. 15, the electronic device may perform an access procedure with the BS through a transmission beam pattern of the BS and a reception beam pattern of the electronic device in operation 1501. For example, the access procedure with the BS may be performed using the transmission beam pattern of the BS and the reception beam pattern of the electronic device 201, determined through operations 301 to 309 of FIG. 3.

The electronic device may identify (determine) whether the electronic device accesses the BS through the access procedure with the BS in operation 1503. For example, the processor 220 may identify whether a response signal (for example, a Random Access Response (RAR)) of an access request signal transmitted from the BS is received through the RACH procedure with the BS.

When the electronic device accesses the BS, the electronic device may communicate with the BS through the transmission beam pattern of the BS and the reception beam pattern of the electronic device in operation 1505. For example, when the RACH procedure with the BS is successful, the processor 220 may transmit/receive data to/from the BS through the transmission beam pattern of the BS and the reception beam pattern of the electronic device 201, determined through operations 301 to 309.

When access to the BS fails, the electronic device may identify a difference in the received signal strength between the reception beam pattern used to access the BS and the wide beam pattern. For example, when access to the BS fails, the processor 220 may measure the received signal strength of the reception beam pattern used to access the BS and the received signal strength of the wide beam pattern. The processor 220 may calculate the difference in the measured received signal strength between the reception beam pattern and the wide beam pattern.

The electronic device may identify (determine) whether the difference in the received signal strength between the reception beam pattern used to access the BS and the wide beam pattern is maintained in operation 1509. For example, the processor 220 may identify whether the difference in the received signal strength between the reception beam pattern and the wide beam pattern, calculated at a previous time point, is the same as or similar to the difference in the received signal strength calculated at the current time point. For example, when a change in the difference of the received signal strength is within a reference range, the processor 220 may determine that the differences in received signal strength at the previous time point and the current time point are the same as or similar to each other.

When the difference in the received signal strength between the reception beam pattern used to access the BS and the wide beam pattern is maintained, the electronic device may increase power for beamforming in the corresponding reception beam pattern without changing the reception beam pattern in operation 1511. For example, the processor 220 may increase power for forming the beam of the reception beam pattern used for the access procedure with the BS in operation 1501 by a reference unit and control the communication module 260 to again perform the access procedure with the BS.

When the difference in the received signal strength between the reception beam pattern used to access the BS and the wide beam pattern is changed, the electronic device may change the reception beam pattern to be used to access the BS in operation 1513. For example, when the difference in the received signal strength between the reception beam pattern used to access the BS and the wide beam pattern is changed, the processor 220 may select another reception beam pattern for performing the access procedure with the BS based on the priority of the reception beam pattern. For example, the processor 220 may select a reception beam pattern having a higher priority than that of the reception beam pattern used for the access procedure with the BS at the previous time point. For example, the priority of the reception beam pattern may be configured based on the difference from the received signal strength of the wide beam pattern.

According to various embodiments of the present disclosure, a method of operating an electronic device may include an operation of forming a wide beam through a plurality of antennas for forming beams in different directions, an operation of determining a transmission beam pattern of a transmitting side through the wide beam, an operation of switching a beam mode of at least one antenna to form a reception beam, and an operation of determining a reception beam pattern to be used for receiving a signal from the transmitting side.

According to various embodiments, the operation of determining a transmission beam pattern may include an operation of receiving at least one signal through the wide beam during a synchronization signal transmission interval of the transmitting side, an operation of detecting one signal based on a received signal strength of the at least one signal, and an operation of selecting a transmission beam pattern applied to the one signal as the transmission beam pattern of the transmitting side, and the at least one signal includes a synchronization signal to which different transmission beam patterns are applied on the transmitting side.

According to various embodiments, the method may further include an operation of receiving at least one signal through the wide beam and an operation of determining whether to use the wide beam based on a received signal strength of a signal received through the wide beam, wherein the operation of determining the transmission beam pattern may include an operation of determining the transmission beam pattern of the transmitting side through the wide beam when it is determined to use the wide beam.

According to various embodiments, when the use of the wide beam is limited, the method may further include an operation of detecting a received signal strength of at least one beam combination, an operation of selecting one beam combination based on the received signal strength of the at least one beam combination, and an operation of selecting a transmission beam pattern and a reception beam pattern corresponding to the one beam combination as the transmission beam pattern of the transmitting side and a reception beam pattern to be used for receiving a signal from the transmitting side, wherein the beam pattern combination may include one of a plurality of transmission beam patterns that can be supported by the transmitting side and one of a plurality of reception beam patterns that can be supported by the electronic device.

According to various embodiments, the operation of selecting the reception beam pattern may include an operation of receiving a synchronization signal of the transmitting side through each reception beam pattern that can be supported by the electronic device and an operation of selecting a reception beam pattern to be used for receiving a signal from the transmitting side based on a received signal strength of the synchronization signal received through each reception beam pattern.

According to various embodiments, when a plurality of reception ports is included, the operation of receiving the synchronization signal may include an operation of receiving the synchronization signal of the transmitting side through different reception beam patterns for respective reception ports in every synchronization signal transmission period of the transmitting side.

According to various embodiments, the method may further include an operation of receiving the synchronization signal of the transmitting side through the wide beam by at least one of the plurality of ports and an operation of detecting the difference between a received signal strength of the synchronization signal received through each reception beam pattern and the received signal strength of the synchronization signal received through the wide beam, wherein the operation of selecting the reception beam pattern may include an operation of selecting a reception beam pattern to be used for receiving a signal from the transmitting side based on the received signal strength of the synchronization signal received through each reception beam pattern and the difference in the received signal strength.

According to various embodiments, the method may further include an operation of identifying a first reception capability of the electronic device using the transmission beam pattern and the reception beam pattern, an operation of forming the wide beam through the at least one antenna when the first reception capability becomes equal to or lower than a reference capability, an operation of identifying a second reception capability of the electronic device using the wide beam, and an operation of determining whether to perform beam reselection based on the difference between the first reception capability and the second reception capability.

According to various embodiments, the operation of determining whether to perform the beam reselection may include an operation of reselecting the transmission beam pattern and the reception beam pattern when the difference between the first reception capability and the second reception capability is less than a reference value and an operation of maintaining the transmission beam pattern and the reception beam pattern when the difference between the first reception capability and the second reception capability is greater than the reference value.

According to various embodiments, the operation of forming the wide beam may include an operation of forming the wide beam by combining signals sequentially received through the plurality of antennas.

In an electronic device and a method of operating the same according to various embodiments, a receiving side can determine a transmission beam pattern to be used when a transmitting side (for example, a BS) transmits a signal through a wide beam (or a broad beam) and thus reduces the amount of time consumed to determine the transmission beam pattern to be used for communication between the electronic device and a transmitting side.

An electronic device and a method of operating the same according to various embodiments can determine a reception beam pattern of a receiving side (for example, the electronic device) by receiving synchronization signals of a transmitting side through reception beams in different patterns through a plurality of reception ports and thus reduce time consumed to determine the reception beam pattern of the electronic device.

An electronic device and a method of operating the same according to various embodiments can limit an unnecessary beam pattern reselection operation by determining whether to reselect the beam pattern based on the received signal strength of the beam pattern that the electronic device selects to use beamforming technology and the received signal strength of the wide beam.

Figure 16:
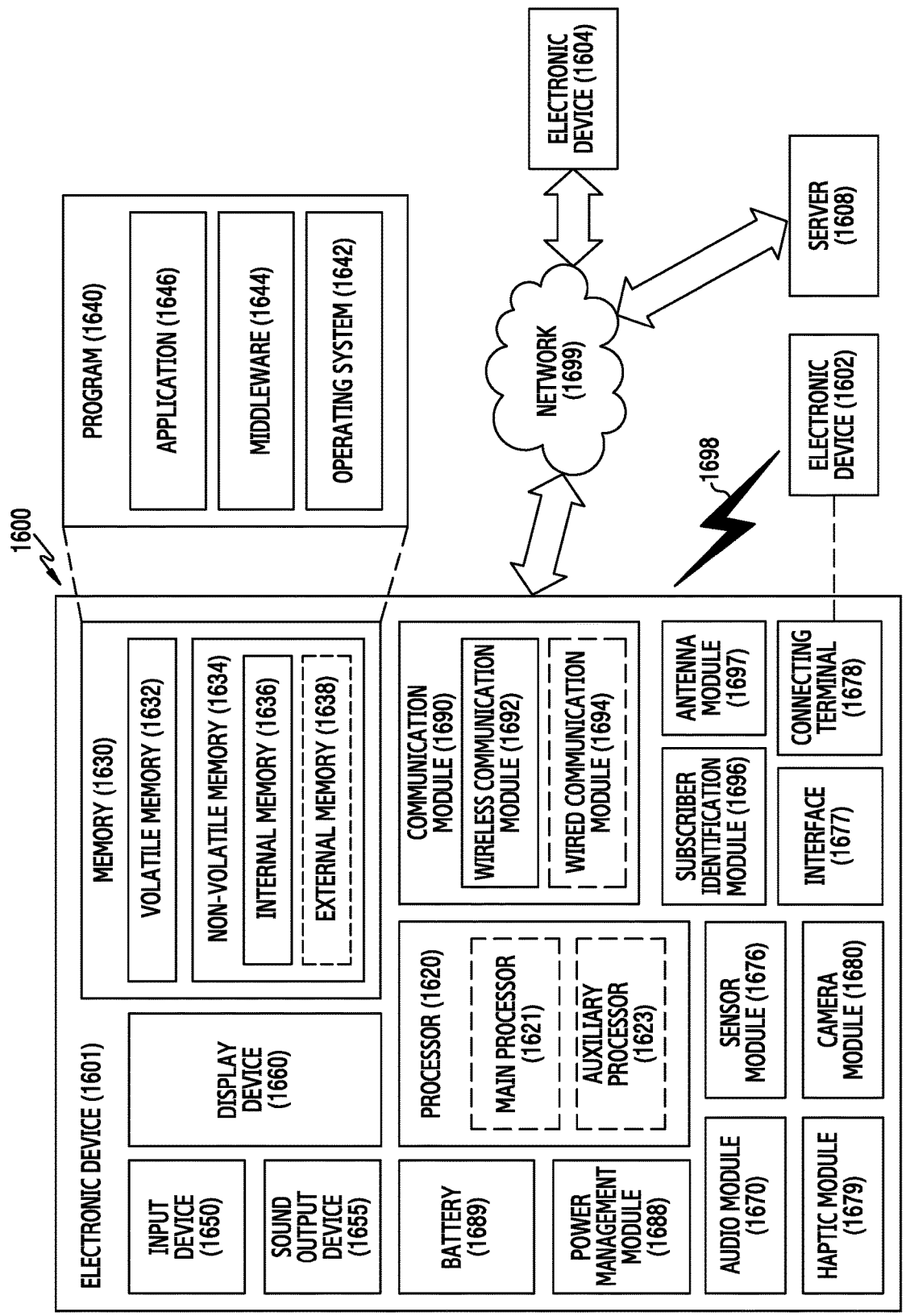
FIG. 16 is a block diagram illustrating an electronic device within a network environment according to various embodiments of the present disclosure.

FIG. 16 is a block diagram illustrating an electronic device 1601 in a network environment 1600 according to various embodiments.

Referring to FIG. 16, the electronic device 1601 in the network environment 1600 may communicate with an electronic device 1602 via a first network 1698 (e.g., a short-range wireless communication network), and/or an electronic device 1604 and/or a server 1608 via a second network 1699 (e.g., a long-range wireless communication network). According to an embodiment, the electronic device 1601 may communicate with the electronic device 1604 via the server 1608.

According to an embodiment, the electronic device 1601 may include a processor (e.g., including processing circuitry) 1620 (e.g., processor 220 of FIG. 2A), memory 1630 (e.g., memory 230 of FIG. 2A), an input device (e.g., including input circuitry) 1650, a sound output device (e.g., including sound output circuitry) 1655, a display device 1660 (e.g., display device 250 of FIG. 2A), an audio module (e.g., including audio circuitry) 1670, a sensor module 1676, an interface (e.g., including interface circuitry) 1677, a haptic module (e.g., including haptic circuitry) 1679, a camera module 1680, a power management module 1688, a battery 1689, a communication module (e.g., including communication circuitry) 1690 (e.g., communication module 260 of FIG. 2A), a subscriber identification module (SIM) 1696, or an antenna module 1697. In some embodiments, at least one (e.g., the display device 1660 or the camera module 1680) of the components may be omitted from the electronic device 1601, or one or more other components may be added in the electronic device 1601. In some embodiments, some of the components may be implemented as single integrated circuitry. For example, the sensor module 1676 (e.g., a fingerprint sensor, an iris sensor, or an illuminance sensor) may be implemented as embedded in the display device 1660 (e.g., a display).

The processor 1620 may include various processing circuitry and execute, for example, software (e.g., a program 1640) to control at least one other component (e.g., a hardware or software component) of the electronic device 1601 coupled with the processor 1620, and may perform various data processing or computation. According to an example embodiment, as at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data and/or output data for a command related thererto. The memory 1630 may include the volatile memory 1632 or the non-volatile memory 1634.

The program 1640 may be stored in the memory 1630 as software, and may include, for example, an operating system (OS) 1642, middleware 1644, and/or an application 1646.

The input device 1650 may receive a command or data to be used by other component (e.g., the processor 1620) of the electronic device 1601, from the outside (e.g., a user) of the electronic device 1601. The input device 1650 may include various input circuitry, such as, for example, and without limitation, a microphone, a mouse, and/or a keyboard, or the like.

The sound output device 1655 may output sound signals to the outside of the electronic device 1601. The sound output device 1655 may include various sound output circuitry, such as, for example, and without limitation, a speaker and/or a receiver, or the like. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 1601. The display device 1660 may include, for example, and without limitation, a display, a hologram device, and/or a projector, or the like and control circuitry to control a corresponding one of the display, hologram device, and projector. According to an embodiment, the display device 1660 may include touch circuitry adapted to detect a touch, or sensor circuitry (e.g., a pressure sensor) adapted to measure the intensity of force incurred by the touch.

The audio module 1670 may include various audio circuitry and convert a sound into an electrical signal and vice versa. According to an embodiment, the audio module 1670 may obtain the sound via the input device 1650, or output the sound via the sound output device 1655 or a headphone of an external electronic device (e.g., an electronic device 1602) directly (e.g., by wire) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., by wire) or wirelessly. According to an embodiment, the interface 1677 may include various interface circuitry, such as, for example, and without limitation, a high definition multimedia interface (HDMI), a universal serial bus (USB) interface, a secure digital (SD) card interface, and/or an audio interface, or the like.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include various haptic circuitry, such as, for example, and without limitation, a motor, a piezoelectric element, and/or an electric stimulator, or the like.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may include various communication circuitry and support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to an embodiment, the antenna module 1697 may include one or more antennas, and, therefrom, at least one antenna appropriate for a communication scheme used in the communication network, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, and/or a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various example embodiments thereof, it will be understood that these embodiments are intended to be illustrative, not limiting. It will be understood by those skilled in the art that various changes, modifications and alternatives are available and fall within the true spirit and full scope of the disclosure as defined, for example, in the appended claims and their equivalents.

What is claimed is:

1. An electronic device comprising:
a plurality of antennas, each of the plurality of antennas including an antenna array including antenna elements configured to form beams in different directions; and
at least one processor,
wherein the at least one processor is configured to:
control at least one of the plurality of antennas to form a first beam having a first width for receiving signals from a transmission side,
in response to a signal strength of the received signals via the first beam being less than a reference quality, control the at least one of plurality of antennas to form a second beam having a second width narrower than the first width of the first beam, and
identify a transmission beam pattern of the transmission side and a reception beam pattern of the electronic device based on a signal strength of signals received via the second beam.

2. The electronic device of claim 1, wherein the at least one processor is configured to:
receive at least one signal through the first beam,
determine whether to use the first beam based on a received signal strength of a signal received through the first beam, and
determine the transmission beam pattern of the transmitting side through the first beam upon determining to use the first beam.

3. The electronic device of claim 2, wherein, upon determining not to use the first beam the at least one processor is configured to:
detect a received signal strength of at least one beam pattern combination,
select one beam pattern combination based on the received signal strength of the at least one beam pattern combination, and
select a transmission beam pattern and a reception beam pattern corresponding to the one beam pattern combination as the transmission beam pattern of the transmitting side and a reception beam pattern to be used for receiving a signal from the transmitting side,
wherein the beam pattern combination includes one of a plurality of transmission beam patterns that is supported by the transmitting side and one of a plurality of reception beam patterns that is supported by the electronic device.

4. The electronic device of claim 1, wherein the at least one processor is configured to: receive a synchronization signal of the transmitting side through each reception beam pattern that is supported by the electronic device and select a reception beam pattern to be used for receiving a signal from the transmitting side based on a received signal strength of the synchronization signal received through each reception beam pattern.

5. The electronic device of claim 4, wherein, when a plurality of reception ports is included, the at least one processor is configured to perform control to receive the synchronization signal of the transmitting side through different reception beam patterns for respective reception ports at every synchronization signal transmission period of the transmitting side.

6. The electronic device of claim 5, wherein the at least one processor is configured to:

receive the synchronization signal of the transmitting side through the first beam by at least one of the plurality of ports,
detect a difference between a received signal strength of the synchronization signal received through each reception beam pattern and a received signal strength of the synchronization signal received through the first beam, and
select a reception beam pattern to be used for receiving a signal from the transmitting side based on the received signal strength of the synchronization signal received through each reception beam pattern and the difference in the received signal strength.

7. The electronic device of claim 1, wherein the at least one processor is configured to:
identify a first reception quality of the electronic device using the transmission beam pattern and the reception beam pattern,
control at least one antenna to form the first beam when the first reception quality becomes equal to or less than the reference quality,
identify a second reception quality of the electronic device using the first beam, and
determine whether to perform beam reselection based on a difference between the first reception quality and the second reception quality.

8. The electronic device of claim 7, wherein the at least one processor is configured to perform control to reselect the transmission beam pattern and the reception beam pattern when the difference between the first reception quality and the second reception quality is less than a reference value and to maintain the transmission beam pattern and the reception beam pattern when the difference between the first reception quality and the second reception quality is greater than the reference value.

9. The electronic device of claim 1, wherein the at least one processor is configured to form the first beam by combining signals sequentially received through the plurality of antennas.

10. A method of operating an electronic device including a plurality of antennas, each of the plurality of antennas including an antenna array including antenna elements configured to form beams in different directions, the method comprising:
controlling at least one of the plurality of antennas to form a first beam having a first width for receiving signals from a transmission side,
in response to a signal strength of the received signals via the first beam being less than a reference quality, controlling the at least one of plurality of antennas to form a second beam having a second width narrower than the first width of the first beam, and
identifying a transmission beam pattern of the transmission side and a reception beam pattern of the electronic device based on a signal strength of signals received via the second beam.

11. The method of claim 10, further comprising:
receiving at least one signal through the first beam; and
determining whether to use the first beam based on a received signal strength of a signal received through the first beam,
wherein the determining of the transmission beam pattern comprises determining the transmission beam pattern of the transmitting side through the first beam upon determining to use the first beam.

12. The method of claim 11, further comprising, upon determining not to use the first beam:

detecting a received signal strength of at least one beam pattern combination;

selecting one beam pattern combination based on the received signal strength of the at least one beam pattern combination; and selecting a transmission beam pattern and a reception beam pattern corresponding to the one beam pattern combination as the transmission beam pattern of the transmitting side and a reception beam pattern to be used for receiving a signal from the transmitting side, wherein the beam pattern combination includes one of a plurality of transmission beam patterns that is supported by the transmitting side and one of a plurality of reception beam patterns that is supported by the electronic device.

13. The method of claim 10, wherein the determining of the reception beam pattern comprises:

receiving a synchronization signal of the transmitting side through each reception beam pattern that is supported by the electronic device; and selecting a reception beam pattern to be used for receiving a signal from the transmitting side based on a received signal strength of the synchronization signal received through each reception beam pattern.

14. The method of claim 13, wherein the receiving of the synchronization signal comprises, when the electronic device includes a plurality of reception ports, receiving the synchronization signal of the transmitting side through different reception beam patterns for respective reception ports at every synchronization signal transmission period of the transmitting side.

15. The method of claim 14, further comprising:

receiving the synchronization signal of the transmitting side through the first beam by at least one of the plurality of ports; and detecting a difference between a received signal strength of the synchronization signal received through each reception beam pattern and a received signal strength of the synchronization signal received through the first beam, wherein the selecting of the reception beam pattern comprises selecting a reception beam pattern to be used for receiving a signal from the transmitting side based on the received signal strength of the synchronization signal received through each reception beam pattern and the difference in the received signal strength.

16. The method of claim 10, further comprising:

identifying a first reception quality of the electronic device using the transmission beam pattern and the reception beam pattern;

forming the first beam through the at least one antenna when the first reception quality becomes equal to or less than the reference quality;

identifying a second reception quality of the electronic device using the first beam; and determining whether to perform beam reselection based on a difference between the first reception quality and the second reception quality.

17. The method of claim 16, wherein the determining whether to perform the beam reselection comprises:

reselecting the transmission beam pattern and the reception beam pattern when the difference between the first reception quality and the second reception quality is less than a reference value; and maintaining the transmission beam pattern and the reception beam pattern when the difference between the first reception quality and the second reception quality is greater than the reference value.

18. The method of claim 10, wherein the forming of the first beam comprises forming the first beam by combining signals sequentially received through the plurality of antennas.

* * * * *